US011858713B2

(12) United States Patent
Borrero et al.

(10) Patent No.: US 11,858,713 B2
(45) Date of Patent: Jan. 2, 2024

(54) INFLATION FEATURE FOR PACKAGE, INFLATION RIG ASSEMBLY, AND METHOD OF INFLATING

(71) Applicant: The Procter & Gamble Company, Cincinnati, OH (US)

(72) Inventors: Susana E Borrero, Mason, OH (US); Joseph Craig Lester, Liberty Township, OH (US); Kevin Joseph Wood, Cincinnati, OH (US); Benjamin G Hesford, Cincinnati, OH (US); Anthony Ogg, West Chester Township, OH (US); Nathan William Valentine, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 17/500,252

(22) Filed: Oct. 13, 2021

(65) Prior Publication Data

US 2022/0135310 A1 May 5, 2022

Related U.S. Application Data

(60) Provisional application No. 63/107,488, filed on Oct. 30, 2020.

(51) Int. Cl.
*B31D 5/00* (2017.01)
*B65D 81/05* (2006.01)
(Continued)

(52) U.S. Cl.
CPC ......... *B65D 81/052* (2013.01); *B31D 5/0078* (2013.01); *B65B 55/20* (2013.01); *B65D 81/03* (2013.01); *B31D 2205/0076* (2013.01)

(58) Field of Classification Search
CPC ............................ B31D 5/0073; B65D 81/052
See application file for complete search history.

(56) References Cited

U.S. PATENT DOCUMENTS 2,213,758 A 9/1940 Eichberg et al.
3,030,640 A 4/1962 Gosman
(Continued)

FOREIGN PATENT DOCUMENTS

CN 1413162 A 4/2003
CN 1550422 A 12/2004
(Continued)

OTHER PUBLICATIONS

PCT Search Report and Written Opinion for PCT/US2021/071955 dated Jan. 5, 2022.
(Continued)

*Primary Examiner* — Timothy P. Kelly
(74) *Attorney, Agent, or Firm* — William E. Gallagher; Kathleen Y. Carter; James Ernest Oehlenschlager

(57) ABSTRACT

An inflation feature for a shipping package, an inflation rig assembly for inflating a shipping package, and a method of inflating a shipping package. The method includes providing an inflation feature and an inflation rig assembly with corresponding alignment features, positioning the inflation feature of a shipping package, in an uninflated state, on to the inflation rig assembly in a first position, moving the inflation rig assembly to a second position, such that the shipping package is in fluid communication with an expansion material source, and inflating the shipping package to an inflated state.

1 Claim, 7 Drawing Sheets

(51) Int. Cl.
*B65B 55/20* (2006.01)
*B65D 81/03* (2006.01)

(56) References Cited

U.S. PATENT DOCUMENTS 3,346,101 A 10/1967 Pestka
3,349,990 A 10/1967 Woodford
3,777,632 A 12/1973 Pepmeier
3,887,213 A 6/1975 Goetz
3,975,885 A 8/1976 Carlisle
4,046,314 A 9/1977 Hill
4,087,002 A 5/1978 Bambara et al.
4,190,158 A 2/1980 Ambrose
4,267,684 A 5/1981 Ambrose
4,491,225 A 1/1985 Baillod
4,651,360 A 3/1987 Wang
4,756,032 A 7/1988 Wang
4,872,558 A 10/1989 Pharo
4,889,252 A 12/1989 Rockom et al.
4,969,312 A 11/1990 Pivert et al.
5,140,801 A 8/1992 Wild
5,170,609 A 12/1992 Bullock et al.
5,217,131 A 6/1993 Andrews
5,272,856 A 12/1993 Pharo
5,307,529 A 5/1994 Wang
5,487,470 A 1/1996 Pharo
5,535,888 A 7/1996 De Luca
5,639,523 A 6/1997 Ellis
5,727,270 A 3/1998 Cope et al.
5,769,232 A 6/1998 Cash et al.
5,770,839 A 6/1998 Ruebush et al.
6,139,188 A 10/2000 Marzano
6,520,332 B1 2/2003 Barmore
6,520,333 B1 2/2003 Tschantz
6,520,491 B2 2/2003 Timlick
6,562,740 B1 5/2003 Todt
6,629,777 B2 10/2003 Tanaka et al.
7,165,677 B2 1/2007 Tanaka
7,303,076 B2 12/2007 Scalise
7,383,953 B2 6/2008 Dickinson
7,422,109 B2 9/2008 Yoshifusa
7,631,762 B2 12/2009 Liao et al.
7,913,848 B2 3/2011 Liao et al.
8,157,096 B2 4/2012 Liao
8,540,094 B2 9/2013 Riedl
8,568,029 B2 10/2013 Kannankeril et al.
8,707,660 B2 4/2014 Howes
8,770,408 B2 7/2014 Tschantz et al.
9,327,867 B2 5/2016 Stanley et al.
9,469,088 B2 10/2016 Stanley et al.
9,623,622 B2 4/2017 Baines
9,694,942 B2 7/2017 Stanley
9,731,885 B2 8/2017 Liao et al.
9,815,258 B2 11/2017 Stanley et al.
10,040,581 B2 8/2018 Stanley et al.
10,167,128 B2 * 1/2019 Nevo ...................... B65B 55/20
11,124,346 B2 9/2021 Borrero et al.
11,338,980 B2 5/2022 Borrero et al.
11,345,532 B2 5/2022 Borrero et al.
11,352,186 B2 6/2022 Lester et al.
11,597,575 B2 3/2023 Borrero et al.
2002/0064319 A1 5/2002 Tanaka et al.
2003/0006162 A1 1/2003 Smith
2003/0024846 A1 2/2003 Nadler
2003/0034270 A1 2/2003 Ribeiro
2003/0128898 A1 7/2003 Malone et al.
2003/0167572 A1 9/2003 Mileti
2004/0101658 A1 5/2004 Kannankeril
2004/0149618 A1 8/2004 Otaki et al.
2005/0077200 A1 4/2005 Tippey
2005/0103676 A1 5/2005 Lee
2005/0109656 A1 5/2005 Ishizaki
2005/0126941 A1 6/2005 Ferri et al.
2005/0189257 A1 9/2005 Chen
2006/0030471 A1 2/2006 Schaller et al.
2006/0207849 A1 9/2006 Sadow
2007/0092164 A1 4/2007 Yasuhira
2007/0199855 A1 8/2007 Lim
2008/0029423 A1 2/2008 Davlin et al.
2008/0035519 A1 2/2008 Swartz et al.
2008/0083640 A1 4/2008 Liu
2009/0242450 A1 10/2009 Zhang
2010/0072103 A1 3/2010 Watanabe et al.
2010/0233438 A1 9/2010 Stone
2010/0308062 A1 12/2010 Helou, Jr.
2011/0068154 A1 3/2011 Kannankeril et al.
2011/0187028 A1 8/2011 Menning et al.
2011/0192121 A1 8/2011 Kannankeril et al.
2011/0247725 A1 10/2011 Frayne et al.
2012/0000807 A1 1/2012 Scarbrough et al.
2012/0067760 A1 3/2012 Tschantz et al.
2012/0097634 A1 4/2012 Riedl
2013/0048529 A1 2/2013 Liao et al.
2013/0058218 A1 3/2013 Wu et al.
2013/0292287 A1 11/2013 Stanley et al.
2013/0292353 A1 11/2013 Stanley et al.
2013/0292395 A1 11/2013 Stanley et al.
2013/0292413 A1 11/2013 Stanley et al.
2013/0292415 A1 11/2013 Stanley et al.
2013/0294711 A1 11/2013 Stanley et al.
2013/0313152 A1 11/2013 Liao
2013/0337244 A1 12/2013 Stanley et al.
2014/0033654 A1 2/2014 Stanley et al.
2014/0033655 A1 2/2014 Stanley
2014/0224700 A1 8/2014 Scarbrough et al.
2014/0328551 A1 11/2014 Nevo
2015/0033671 A1 2/2015 Stanley
2015/0034670 A1 2/2015 Stanley et al.
2015/0036950 A1 2/2015 Stanley et al.
2015/0121810 A1 5/2015 Bourgeois et al.
2015/0122373 A1 5/2015 Bourgeois et al.
2015/0122840 A1 5/2015 Cox et al.
2015/0122841 A1 5/2015 Mcguire et al.
2015/0122842 A1 5/2015 Berg, Jr. et al.
2015/0122846 A1 5/2015 Stanley et al.
2015/0125099 A1 5/2015 Ishihara et al.
2015/0125574 A1 5/2015 Arent et al.
2015/0128349 A1 5/2015 Ishihara et al.
2015/0259120 A1 9/2015 Liao
2015/0287343 A1 10/2015 Moore
2015/0314940 A1 11/2015 Matta
2016/0058218 A1 3/2016 Yoshifusa et al.
2016/0088981 A1 3/2016 Cameron et al.
2016/0122112 A1 5/2016 Nevo et al.
2016/0176578 A1 6/2016 Stanley et al.
2016/0176582 A1 6/2016 Mcguire et al.
2016/0176584 A1 6/2016 Ishihara et al.
2016/0176597 A1 6/2016 Ishihara et al.
2016/0178583 A1 6/2016 Ishihara et al.
2016/0221727 A1 8/2016 Stanley et al.
2016/0297569 A1 10/2016 Berg, Jr. et al.
2016/0297589 A1 10/2016 You et al.
2016/0297590 A1 10/2016 You et al.
2016/0297591 A1 10/2016 Yau et al.
2016/0325518 A1 11/2016 Ishihara et al.
2016/0362228 A1 12/2016 Mcguire et al.
2017/0001782 A1 1/2017 Arent et al.
2017/0121093 A1 5/2017 Liao et al.
2017/0233116 A1 8/2017 Stanley et al.
2017/0247164 A1 8/2017 Zhang
2017/0305609 A1 10/2017 Mcguire et al.
2017/0305627 A1 10/2017 Arent et al.
2017/0314283 A1 11/2017 Liu
2018/0036989 A1 2/2018 Baines
2018/0079574 A1 3/2018 Ishihara et al.
2018/0118438 A1 5/2018 Yamamoto et al.
2018/0236741 A1 8/2018 Hargett et al.
2018/0237172 A1 8/2018 Lester et al.
2018/0257836 A1 9/2018 Mcguire et al.
2018/0297725 A1 10/2018 Bourgeois et al.
2018/0312283 A1 11/2018 Bourgeois et al.
2018/0312286 A1 11/2018 Lester et al.
2018/0370709 A1 12/2018 Kim
2019/0352033 A1 11/2019 Lester et al.

(56) References Cited

U.S. PATENT DOCUMENTS

| | | | |
|---|---|---|---|
| 2020/0024049 | A1 | 1/2020 | Borrero |
| 2020/0024050 | A1 | 1/2020 | Borrero |
| 2020/0024051 | A1 | 1/2020 | Lester |
| 2020/0024053 | A1 | 1/2020 | Borrero |
| 2020/0024054 | A1 | 1/2020 | Borrero |
| 2020/0024055 | A1 | 1/2020 | Borrero |
| 2020/0024056 | A1 | 1/2020 | Borrero |
| 2020/0024057 | A1 | 1/2020 | Borrero |
| 2020/0024058 | A1 | 1/2020 | Clare |
| 2021/0284420 | A1 | 9/2021 | Borrero et al. |
| 2021/0291480 | A1 | 9/2021 | Opuszko et al. |
| 2021/0309435 | A1 | 10/2021 | Zhang et al. |

FOREIGN PATENT DOCUMENTS

| | | | |
|---|---|---|---|
| CN | 101357705 | A | 2/2009 |
| CN | 201332783 | Y | 10/2009 |
| CN | 202863950 | U | 4/2013 |
| CN | 104245058 | A | 12/2014 |
| CN | 104284778 | A | 1/2015 |
| CN | 105408226 | A | 3/2016 |
| CN | 206278472 | U | 6/2017 |
| CN | 107107477 | A | 8/2017 |
| CN | 110817123 | A | 2/2020 |
| CN | 111231470 | A | 6/2020 |
| DE | 102012214862 | A1 | 5/2014 |
| EP | 1251080 | A1 | 10/2002 |
| EP | 2014576 | A1 | 1/2009 |
| EP | 2631195 | A1 | 8/2013 |
| EP | 2801537 | A1 | 11/2014 |
| EP | 3575239 | A1 | 12/2019 |
| FR | 2680764 | A1 | 3/1993 |
| GB | 330566 | A | 6/1930 |
| GB | 1403912 | A | 8/1975 |
| GB | 2213464 | A | 8/1989 |
| JP | H05201473 | A | 8/1993 |
| JP | 2001240138 | A | 9/2001 |
| JP | 2003118772 | A | 4/2003 |
| JP | 2011073717 | A | 4/2011 |
| JP | 2017137112 | A | 8/2017 |
| WO | 9601775 | A1 | 1/1996 |
| WO | 9737905 | A1 | 10/1997 |
| WO | 03082699 | A1 | 10/2003 |
| WO | 2004103851 | A1 | 12/2004 |
| WO | 2012073004 | A2 | 6/2012 |
| WO | 2014199368 | A1 | 12/2014 |
| WO | 2015012558 | A1 | 1/2015 |
| WO | 2016078579 | A1 | 5/2016 |
| WO | 2017150857 | A2 | 9/2017 |
| WO | 2018080909 | A1 | 5/2018 |

OTHER PUBLICATIONS

All Office Actions; U.S. Appl. No. 17/684,466, filed Mar. 2, 2022.
All Office Actions; U.S. Appl. No. 17/691,163, filed Mar. 10, 2022.
Unpublished U.S. Appl. No. 17/684,466, filed Mar. 2, 2022, to Susana E. Borrero et al.
Unpublished U.S. Appl. No. 17/691,163, filed Mar. 10, 2022, to Susana E Borrero et al.
All Office Actions: U.S. Appl. No. 16/515,317, filed Jul. 18, 2019.
All Office Actions; U.S. Appl. No. 16/515,331, filed Jul. 18, 2019.
All Office Actions; U.S. Appl. No. 16/515,365, filed Jul. 18, 2019.
All Office Actions; U.S. Appl. No. 16/515,416, filed Jul. 18, 2019.
All Office Actions; U.S. Appl. No. 16/515,507, filed Jul. 18, 2019.
All Office Actions: U.S. Appl. No. 16/515,537, filed Jul. 18, 2019.
All Office Actions: U.S. Appl. No. 16/515,887, filed Jul. 18, 2019.
All Office Actions; U.S. Appl. No. 16/516,173, filed Jul. 18, 2019.
All Office Actions; U.S. Appl. No. 16/516,175, filed Jul. 18, 2019.
All Office Actions; U.S. Appl. No. 17/190, 452, filed Mar. 3, 2021.
All Office Actions; U.S. Appl. No. 17/506,026, filed Oct. 20, 2021.
Campbell, Phillip John, "The Rigidified Standing Pouch—A Concept For Flexible Packaging", A Thesis Written in Partial Fulfillment Of The Requirements For The Degree Of Master Of Industrial Design, North Carolina State University School Of Design Raleigh, 1993, pp. 1-35.
Unpublished U.S. Appl. No. 17/506,026, filed Oct. 20, 2021, to Joseph Craig Lester et al.

* cited by examiner

INFLATION FEATURE FOR PACKAGE, INFLATION RIG ASSEMBLY, AND METHOD OF INFLATING

FIELD

The present disclosure relates in general to shipping packages, and, in particular, to an inflation feature for a shipping package, an inflation rig assembly for inflating a shipping package, and a method of inflation involving use of the inflation feature and the inflation rig assembly.

BACKGROUND

E-commerce, or the use of the internet to find and purchase goods, is becoming a very popular way for consumers to shop. The advantages of e-commerce are many including: time-savings; competition; shopping at home, work from virtually anywhere; and importantly, the purchaser not having to transport the purchased articles from the location of purchase to the home or place of use. In the e-commerce system, goods purchased by consumers are generally transported to their homes or places of use by the seller or a service used by the seller. Many e-commerce retailers rely on shipping their goods through the mail, including government mail services and other private and semi-private mail services, or through other parcel or parcel-like delivery services. Such mail and parcel services are typically quite convenient to both the buyer and seller. However, transportation of fragile, heavy and/or bulky goods can be quite expensive due to the cost of the manual labor and materials needed to protect the goods during shipment.

These aspects, and others, relating to the shipment of goods through current mail and parcel delivery services create unique issues that, if not addressed, can negatively affect the cost and quality of the goods sold. For example, when shipping goods to consumers, the goods generally need to be disposed in a package that is strong, lightweight and convenient for the shipper and for the customer. That is, it should be designed to be capable of protecting (e.g., isolating, cushioning, immobilizing) the products being shipped from external conditions throughout the shipping process, and preferably so as to minimize material usage, weight and bulkiness. It should also be easy to construct, pack, close, label, open, and discard. If the shipping package does not meet any one or all of these characteristics, it can lead to extra costs, inconvenience for the seller or buyer, product damage, and/or consumer dissatisfaction.

Currently, most shipping packages are some form of flexible pouch (e.g., envelope) made from paper or plastic, or a box, often constructed from corrugated paperboard or cardboard. Although these shipping packages can be used to ship many different types of goods and are reasonably inexpensive, many are generically shaped or otherwise limited in their ability to provide a custom fit for the products being shipped. This can lead to additional packaging being required to prevent damage to the products being shipped, significant volume being taken up in shipping trucks and warehouses due to the ill-fitting packaging, and difficulty for the consumer to open and/or discard of the shipping packaging. To address the ill-fitting, generic packaging, sellers often stuff the outer shipping packages with some type of material intended to fill the open area not filled by the goods themselves. Alternatively, sellers may employ additional processes to manipulate the products, and/or add protective layers to the product or primary packaging to ensure the product can be safe when placed into generic containers. However, both of these scenarios add more steps to the process, weight, waste, and cost to the packaging and packing process, and often makes the consumer's experience when opening the package less than desirable (e.g., "packing peanuts" falling out of the package, needing a tool to open the package, etc.). Further, many of the current shipping packages are not weather or environment-resistant and can be damaged by or allow damage to the products being shipped by precipitation, wet surfaces and/or humidity. Accordingly, often such packages are wrapped in additional materials or must be placed in protected locations if they are to be left outside or unattended for any period of time.

The introduction of shipping packages having inflatable portions have provided a shipping package that is low cost, yet flexible in terms of fit to the products being shipped. It has provided a shipping package that requires no additional fill or dunnage to protect the goods. It also has provided a shipping package that is easy to pack; that is lightweight, but provides protection to the goods being shipped; that is easy to close; that is easy to discard; that takes up very little volume before and after use and is efficient in terms of volume when configured for shipping. However, it would be desirable to provide the package with an inflation feature that helps the user more easily and efficiently inflate or expand the desired expansion chambers. It would also be desirable to provide an inflation rig assembly that complements the inflation feature and can coordinate with the same to further facilitate the desired ease and efficiency of inflation during pack out and or fulfilment operation. It would also be desirable to provide methods for inflating a shipping package involving the inflation feature and the inflation rig assembly. These and other benefits may be provided by one or more of the embodiments of the invention described herein.

SUMMARY

The present invention relates to inflation feature for a shipping package. The inflation feature includes one or more inner sheets; one or more outer sheets, wherein the one or more inner sheets and the one or more outer sheets define a top surface and a bottom surface and extend from a body of the shipping package, adjacent one or more expansion ports in fluid communication with one or more expansion chambers formed by the one or more inner sheets and the one or more outer sheets and adapted to receive an expansion material; one or more primary alignment features, wherein the one or more primary alignment features are configured to facilitate positioning of the shipping package on an inflation rig assembly for inflation; and one or more inflation ports, wherein each of the one or more inflation ports is in fluid communication with the expansion ports at a first end and defines an aperture in the top surface of the inflation feature at a second end.

The present invention also relates to an inflation rig assembly for inflating a shipping package. The inflation rig assembly includes a first portion including a frame and one or more nozzle assemblies, wherein each of the one or more nozzle assemblies includes a nozzle; a gasket surrounding the nozzle; and an expansion material line connected to the nozzle and in fluid communication with an expansion material source; and a second portion including a base plate, wherein the base plate includes one or more secondary alignment features and one or more grooves that correspond to the one or more nozzle assemblies; and wherein the frame is movably associated with the base plate, such that the first portion is movable between a first position, in which the nozzle assemblies are away from the base plate second portion, and a second position, in which a tip of each nozzle of the one or more nozzle assemblies is positioned within a corresponding groove of the one or more grooves of the base plate.

The present invention also relates to method of inflating a shipping package. The method includes the step of providing an uninflated shipping package, the shipping package including one or more inner sheets; one or more outer sheets, wherein the one or more inner sheets and the one or more outer sheets are joined together at least at outer seams thereof to form one or more expansion chambers adapted to receive an expansion material; one or more expansion ports in fluid communication with the one or more expansion chambers through which an expansion material can be introduced into the one or more expansion chambers; and an inflation feature, wherein the inflation feature extends from of the one or more inner sheets and the one or more outer sheets adjacent the one or more expansion ports, the inflation feature comprising a top surface and a bottom surface and including one or more primary alignment features and one or more inflation ports, wherein each of the one or more inflation ports is in fluid communication with the expansion ports at a first end. The method also includes the step of providing an inflation rig assembly, the inflation rig assembly including a first portion including a frame and one or more nozzle assemblies, wherein the nozzle assemblies include a nozzle; a gasket surrounding the nozzle; and an expansion material line connected to the nozzle and in fluid communication with an expansion material source; and a second portion including a base plate, wherein the base plate includes one or more secondary alignment features and one or more grooves that correspond to the one or more nozzle assemblies; and wherein the frame is movably associated with the base plate, such that the first portion is movable between a first position, in which the nozzle assemblies are away from the base plate second portion, and a second position, in which a tip of each nozzle of the one or more nozzle assemblies is positioned within a corresponding groove of the one or more grooves of the base plate. The method further includes the step of positioning the uninflated shipping package onto the inflation rig assembly with the first portion in the first position, wherein the bottom surface of the inflation feature is in contact with the base plate and the one or more primary alignment features are in alignment with the secondary alignment features, such that the one or more inflation ports are positioned over a portion of the one or more grooves. The method also includes the step of moving the first portion of the inflation rig assembly to the second position, such that the tips of the nozzles penetrate second end of the respective inflation ports, the inflation ports are in fluid communication with the expansion material source, and the gaskets are in contact with one or both of the inflation feature and the base plate to form a seal. The method further includes the step of inflating the shipping package to an inflated state.

The present invention also relates to a method of packing articles in shipping packages. The method includes the step of providing an uninflated first shipping package, the first shipping package including one or more inner sheets; one or more outer sheets, wherein the one or more inner sheets and the one or more outer sheets are joined together at least at outer seams thereof and forming one or more expansion chambers adapted to receive an expansion material; one or more expansion ports in fluid communication with the one or more expansion chambers through which an expansion material can be introduced into the one or more expansion chambers; and an inflation feature, wherein the inflation feature extends from the one or more inner sheets and the one or more outer sheets adjacent the one or more expansion ports, the inflation feature having a top surface and a bottom surface and including one or more primary alignment features and one or more inflation ports, wherein each of the one or more inflation ports is in fluid communication with the expansion ports at a first end; and wherein the first uninflated shipping package defines a closeable opening to an article reservoir capable of receiving the article. The method also includes the step of providing an inflation rig assembly, the inflation rig assembly including a first portion including a frame and one or more nozzle assemblies, wherein the nozzle assemblies include a nozzle; a gasket surrounding the nozzle; and an expansion material line connected to the nozzle and in fluid communication with an expansion material source; and a second portion including a base plate, wherein the base plate includes one or more secondary alignment features and one or more grooves that correspond to the one or more nozzle assemblies; and wherein the frame is movably associated with the base plate, such that the first portion is movable between a first position, in which the nozzle assemblies are away from the base plate second portion, and a second position, in which a tip of each nozzle of the one or more nozzle assemblies is positioned within a corresponding groove of the one or more grooves of the base plate. The method further includes the step of securing a first article in the article reservoir of the uninflated first shipping package by placing the first article in the article reservoir and closing the closeable opening. The method also includes the step of positioning the uninflated first shipping package on to the inflation rig assembly with the first portion in the first position, wherein the bottom surface of the inflation feature is in contact with the base plate and the one or more primary alignment features are in alignment with the secondary alignment features, such that the one or more inflation ports are positioned over the one or more grooves. The method further includes the step of moving the first portion of the inflation rig assembly to the second position, such that the tips of the nozzles penetrate a second end of the respective inflation ports, the inflation ports are in fluid communication with the expansion material source, and the gaskets are in contact one or both of the inflation feature and the base plate to form a seal. The method also includes the step of inflating the uninflated first shipping package to an inflated state. The method further includes the step of providing an uninflated second shipping package and securing a second article in the article reservoir of the second uninflated shipping package during inflating the uninflated first shipping package to an inflated state.

The present invention also relates to an evacuation feature for a shipping package, the evacuation feature including one or more inner sheets; one or more outer sheets, wherein the one or more inner sheets and the one or more outer sheets define a top surface and a bottom surface and extend from a body of the shipping package, adjacent one or more reservoir ports in fluid communication with a reservoir formed by the one or more inner sheets and/or the one or more outer sheets; one or more primary alignment features, wherein the one or more primary alignment features are configured to facilitate positioning of the shipping package on a vacuum rig assembly for evacuation; and one or more evacuation ports, wherein each of the one or more evacuation ports is in fluid communication with the reservoir ports at a first end.

These and additional features will be more fully disclosed in the following detailed description in conjunction with the drawings.

BRIEF DESCRIPTION OF THE DRAWINGS

Several figures are provided to help the reader understand the invention. The figures are intended to be viewed in conjunction with the specification and are not intended to be limiting beyond that of the wording of the specification. Reference numbers are used to identify different features of the figures. The same reference numbers are used throughout the specification and drawings to show the same features, regardless of the variation of the invention that is depicted.

DETAILED DESCRIPTION

Figure 1:
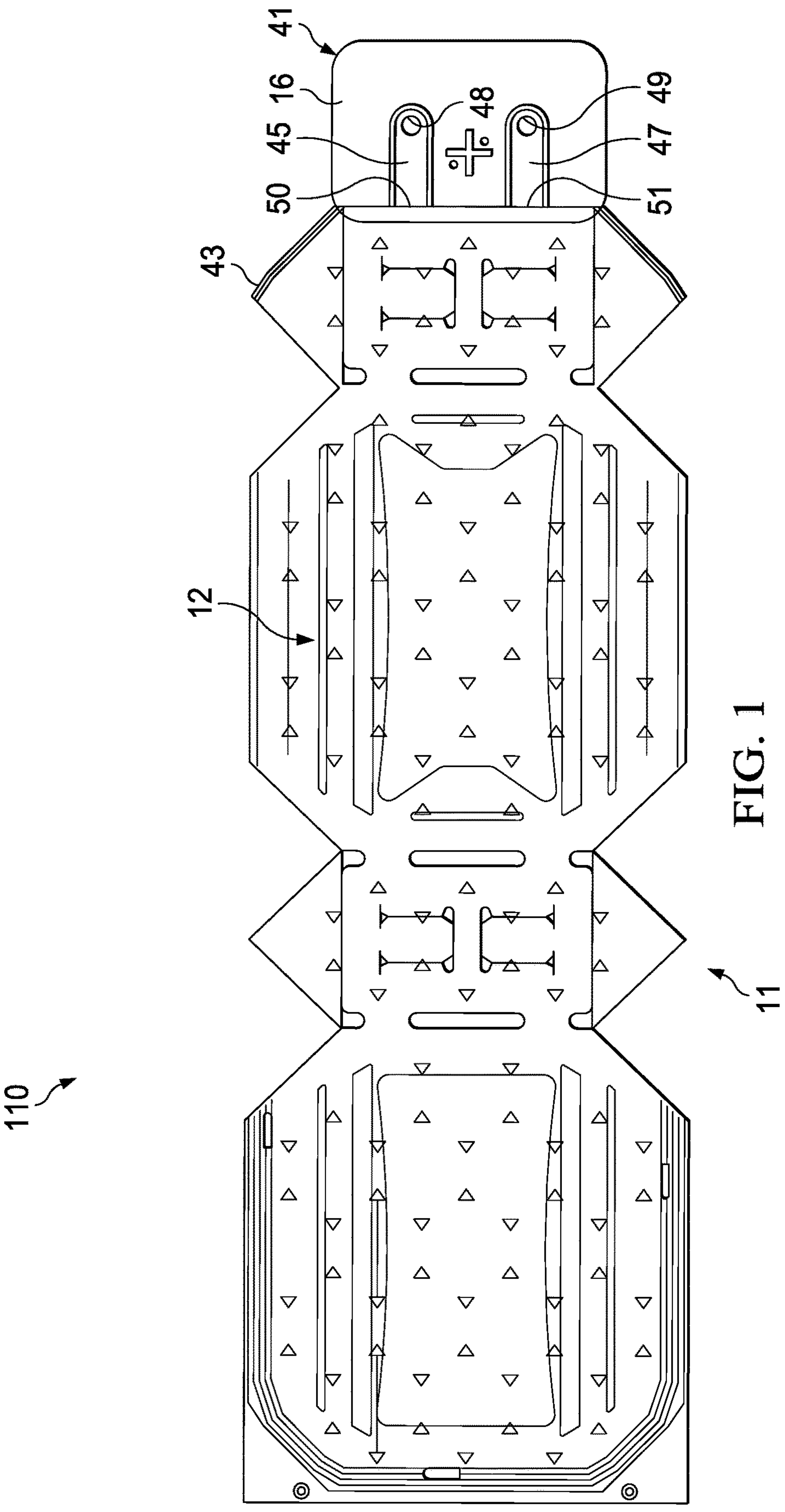
FIG. 1 depicts a plan view of a shipping package, in an uninflated state, having an inflation feature.

The present disclosure describes packages, such as primary packages, secondary packages, shipping packages, display packages and/or other packages made from one or more flexible materials, where the packages include an inflation feature. Furthermore, the present disclosure describes an inflation rig assembly associated with inflating such packages. The inflation feature and the inflation rig assembly described herein can be used in combination to more easily and efficiently inflate and expand packages. For example, complementary alignment features on each of the inflation feature and the inflation rig assembly can allow a user to ensure proper positioning and/or effective securement of the package or uninflated package blank on the inflation rig assembly. Such positioning and/or securement can provide for easier and more efficient inflation of the package, resulting in reduced inflation times. As inflation time can be a rate-limiting step in a fulfillment process, inclusion of the inflation feature and the inflation rig assembly can improve such processes and reduce or eliminate issues relating to meeting desired fulfillment times. Methods of inflating a package relating to the use of the inflation feature and the inflation rig assembly are also described herein.

As used herein, the term "ambient conditions" refers to a temperature within the range of 15-35 degrees Celsius and a relative humidity within the range of 35-75%.

As used herein, the term "closed" refers to a state of a package, wherein any products within the package are prevented from escaping the package (e.g., by one or more materials that form a barrier), but the package is not necessarily hermetically sealed. For example, a closed package can include a vent, which allows a head space in the package to be in fluid communication with air in the environment outside of the package.

As used herein, when referring to a flexible package, the terms "disposable" and "single use" refer to packages which, after being used for its intended purpose (e.g., shipping a product to an end user), are not configured to be reused for the same purpose, but is configured to be disposed of (i.e. as waste, compost, and/or recyclable material). Part, parts, or all of any of the flexible packages, disclosed herein, can be configured to be disposable and/or recyclable.

As used herein, when referring to a flexible package, the terms "expanded" or "inflated" refer to the state of one or more flexible materials that are configured to change shape when an expansion material is disposed therebetween. An expanded structure has one or more dimensions (e.g., length, width, height, thickness) that is significantly greater than the combined thickness of its one or more flexible materials, before the structure has one or more expansion materials disposed therein. Examples of expansion materials include liquids (e.g., water), gases (e.g., compressed air), fluent products, foams (that can expand after being added into a structural support volume), co-reactive materials (that produce gas or foam), or phase change materials (that can be added in solid or liquid form, but which turn into a gas; for example, liquid nitrogen or dry ice), or other suitable materials known in the art, or combinations of any of these (e.g., fluent product and liquid nitrogen). Expansion materials can be added at atmospheric pressure, or added under pressure greater than atmospheric pressure, or added to provide a material change that will increase pressure to something above atmospheric pressure. For any of the flexible packages disclosed herein, its one or more flexible materials can be expanded at various points in time with respect to its manufacture, sale, and use. For example, one or more portions of the package may be expanded before or after the product to be shipped in the package is inserted into the package, and/or before or after the flexible package is purchased by an end user.

As used herein, the terms "eye mark" and "fiducial" are interchangeable and refer to marks or features on materials in manufacturing processes that are used as reference points (e.g., by detection devices). While the term "eye mark" is sometimes used to refer to printed fiducials, the terms eye mark and fiducials, as used herein, can refer to marks or features that are formed in any suitable manner. Suitable manners of forming eye marks or fiducials include, but are not limited to: printing; marking (including but not limited to by visible marks, and by ultra violet markers); forming the eye mark or fiducial using a sealing mechanism (i.e., forming a seal using a process similar to that used to form the seal, but with a more well-defined edge); deforming; forming holes (e.g., pinholes, or the like). Thus, in some cases (e.g., when the eye mark is formed by a sealing mechanism), the eye mark may comprise a discrete melted and deformed feature in (or portion of) a web or piece of material.

As used herein, the term "non-expanded" refers to the state of one or more flexible materials that are sealed such that they are configured to not change shape when an expansion material is disposed into the package. A non-expanded structure has one or more dimensions (e.g., length, width, height, thickness) that is substantially the same as the combined thickness of its one or more flexible materials, before the package has one or more expansion materials disposed therein. A non-expanded structure can be sealed apart from adjacent expansion chambers such that expansion material(s) cannot access the non-expansion structure. For example, a non-expansion structure or a non-expansion chamber can be sealed off from the expansion chamber(s) and any expansion ports or valves.

As used herein, the term "flexible shipping package" refers to a flexible package configured to have an article reservoir for containing one or more articles for shipment. Examples of flexible materials from which the packages can be made include film, woven web, non-woven web, paper, foil or combinations of these and other flexible materials.

As used herein, the term "flexibility factor," when referring to a flexible container, refers to a material parameter for a thin, easily deformable, sheet-like material, wherein the parameter is measured in Newtons per meter, and the flexibility factor is equal to the product of the value for the Young's modulus of the material (measured in Pascals) and the value for the overall thickness of the material (measured in meters).

As used herein, when referring to a flexible package, the term "flexible material" refers to a thin, easily deformable, sheet-like material, having a flexibility factor within the range of 1,000-2,500,000 N/m. Flexible materials can be configured to have a flexibility factor of 1,000-2,500,000 N/m, or any integer value for flexibility factor from 1,000-2,500,000 N/m, or within any range formed by any of these values, such as 1,000-1,500,000 N/m, 1,500-1,000,000 N/m, 2,500-800,000 N/m, 5,000-700,000 N/m, 10,000-600,000 N/m, 15,000-500,000 N/m, 20,000-400,000 N/m, 25,000-300,000 N/m, 30,000-200,000 N/m, 35,000-100,000 N/m, 40,000-90,000 N/m, or 45,000-85,000 N/m, etc. Throughout the present disclosure the terms "flexible material", "flexible sheet", "sheet", and "sheet-like material" are used interchangeably and are intended to have the same meaning. Part, parts, or all of a flexible material can be coated or uncoated, treated or untreated, processed or unprocessed, in any manner known in the art. Parts, parts, or about all, or approximately all, or substantially all, or nearly all, or all of a flexible material can made of sustainable, bio-sourced, recycled, recyclable, and/or biodegradable material. Part, parts, or about all, or approximately all, or substantially all, or nearly all, or all of any of the flexible materials described herein can be partially or completely translucent, partially or completely transparent, or partially or completely opaque. The flexible materials used to make the packages disclosed herein can be formed in any manner known in the art, and can be joined together using any kind of joining or sealing method known in the art, including, for example, heat sealing (e.g., conductive sealing, impulse sealing, ultrasonic sealing, etc.), welding, crimping, bonding, adhering, and the like, and combinations of any of these.

As used herein, the term "joined" refers to a configuration wherein elements are either directly connected or indirectly connected.

As used herein, when referring to a sheet or sheets of flexible material, the term "thickness" refers to a linear dimension measured perpendicular to the outer major surfaces of the sheet, when the sheet is lying flat. The thickness of a package is measured perpendicular to a surface on which the package is placed such that the sheet would be lying flat if the package were not in an expanded state. To compare the thickness of a package in an unexpanded state, an expanded state and a deflated state, the thickness of each should be measured in the same orientation on the same surface. For any of the configurations, the thickness is considered to be the greatest thickness measurement made across the surface or face of the article in that particular orientation.

As used herein, the term "article reservoir" refers to an enclosable three-dimensional space that is configured to receive and contain one or more articles or products. This three-dimensional space may enclose a volume, the "article reservoir volume". The articles or products may be directly contained by the materials that form the article reservoir. By directly containing the one or more products, the products come into contact with the materials that form the enclosable three-dimensional space, there is no need for an intermediate material or package. Throughout the present disclosure the terms "reservoir" and "article reservoir" are used interchangeably and are intended to have the same meaning. The shipping packages described herein can be configured to have any number of reservoirs. Further, one or more of the reservoirs may be enclosed within another reservoir. Any of the reservoirs disclosed herein can have a reservoir volume of any size. The reservoir(s) can have any shape in any orientation.

As used herein, when referring to a flexible package, the term "expansion chamber" refers to a fillable space made from one or more flexible materials, wherein the space is configured to be at least partially filled with one or more expansion materials, which create tension in the one or more flexible materials, and form an expanded volume.

As used herein, when referring to a flexible package, the term "non-expansion chamber" refers to a space made from one or more flexible materials, where the space is not contiguous with any expansion chamber. A non-expansion chamber cannot be filled with an expansion material. For example, a non-expansion chamber is sealed off from expansion chamber(s) provided in the package.

As used herein, the term "removable," with respect to the inflation feature, means that at least a portion of the inflation feature is removable. The entire inflation feature need not be removable.

As used herein, when referring to a flexible package, the term "unexpanded" refers to the state of an expansion chamber, when the chamber does not include an expansion material.

Package and Inflation Feature

Flexible shipping packages, as described herein, may be used across a variety of industries for a variety of products. For example, flexible packages, as described herein, may be used for shipping across the consumer products industry, including but not limited to the following products: cleaning products, disinfectants, dishwashing compositions, laundry detergents, fabric conditioners, fabric dyes, surface protectants, cosmetics, skin care products, hair treatment products, soaps, body scrubs, exfoliants, astringents, scrubbing lotions, depilatories, antiperspirant compositions, deodorants, shaving products, pre-shaving products, after shaving products, toothpaste, mouthwash, personal care products, baby care products, feminine care products, insect repellants, foods, beverages, electronics, medical devices and goods, pharmaceuticals, supplements, toys, office supplies, household goods, automotive goods, aviation goods, farming goods, clothing, shoes, jewelry, industrial products, and any other items that may be desirable to ship through the mail or other parcel services, etc.

The flexible packages disclosed herein can be configured to have an overall shape. In the unexpanded state, the overall shape may correspond to any known two-dimensional shape including polygons (shapes generally comprised of straight-portions connected by angles), curved-shapes (including circles, ovals, and irregular curved-shapes) and combinations thereof. In the expanded state, the overall shape may correspond with any other known three-dimensional shape, including any kind of polyhedron, any kind of prismatoid, and any kind of prism (including right prisms and uniform prisms).

The flexible shipping package, and/or its blank (i.e., an uninflated article before it is assembled into a final shipping package), may include any number of sheets. For example, the package may comprise two sheets such as an inner sheet and an outer sheet. The package may include three sheets such as an inner sheet, and outer sheet and a secondary outer sheet. The package may comprise four sheets such as an inner sheet, a secondary inner sheet, and outer sheet and a secondary outer sheet. The package and/or package blank may include more than four sheets.

Shipping packages suitable for use with the inflation feature 41 are disclosed, for example, U.S. Patent Publication No. 2020/0024049, U.S. Patent Publication No. 2020/0024050, U.S. Patent Publication No. 2020/0024051, U.S. Patent Publication No. 2020/0024053, U.S. Patent Publication No. 2020/0024054, U.S. Patent Publication No. 2020/0024055, U.S. Patent Publication No. 2020/0024056, U.S. Patent Publication No. 2020/0024057, U.S. Patent Publication No. 2020/0024058, U.S. Patent Publication No. 2019/0352068, and U.S. Provisional Patent Application No. 62/989,135, all of which are incorporated herein by reference.

FIG. 1 depicts a plan view of a blank 110 of a shipping package, laid open and in an uninflated state. In the example of FIG. 1, an inner sheet 12, a secondary inner sheet, an outer sheet, and a secondary outer sheet are disposed on top each other to form a four-layer assembly. As shown, the blank 110 has not yet been folded upon itself to form an unexpanded package. The blank 110 may further include an inflation feature 41 extending therefrom, which can facilitate the inflation of the package.

In one example, the package can include the four-layer assembly described above. That is, that package may include the inner sheet 12 and the outer sheet 14, shown in the inflation feature 41 of FIG. 2, where the inner sheet 12 may be at least partially joined to the outer sheet 14 at an outer seam. The package can also include the secondary inner sheet 23 and the secondary outer sheet 16, also shown in FIG. 2, which may be at least partially joined to or contiguous with the inner sheet 12 and the outer sheet 14 at an outer seam. The package also may include one or more expansion ports 50, 51 to allow a user to direct an expansion material into one or more expansion chambers to expand the package. The inflation feature 41, having a top surface and a bottom surface, may be formed from any adjacent sheets of the four-layer assembly and extend from a body 43 of the shipping package, adjacent the one or more expansion ports 50, 51 in fluid communication with one or more expansion chambers. For example, in the depicted example including four sheets, the inflation feature 41 may be formed from the outer and secondary outer sheets and/or from the inner and secondary inner sheets. Alternatively, in an example including three sheets, the inflation feature 41 may be formed from the outer and secondary outer sheets and/or from the inner and outer sheets.

Further, in some examples, the package may include a closeable opening and a closure mechanism. In such examples, the closable opening may allow a user to place one or more articles in the package before shipping.

The package may be relatively thin, flat and planar in its non-expanded or uninflated state. That is, a thickness of the unexpanded package is relatively small when compared to a length and width of the package in its non-expanded or uninflated state or configuration. The package to be formed from the blank 110 of FIG. 1, for example, may be constructed from four layers of material that are folded to form a top portion, side portions, and a bottom portion of the package. Alternatively, any or all of the top, bottom and side portions may be formed separately and joined. For example, the top portion of the package may be joined to the bottom portion along at least a portion of a longitudinal side 11 of the package at one or more outer seams. The terms "top" and "bottom" are not intended to be limiting, but rather merely to help more clearly distinguish parts of the package from each other. As such, unless specifically set forth, the terms should not be considered to limit the orientation of the package in any way. The outer seam can take on any desired shape and size and can be formed by any suitable method or material. For example, the outer seam may be formed by glue, heat (e.g., ultrasound, conductive sealing, impulse sealing, ultrasonic sealing, or welding), mechanical crimping, sewing, or by any other known or developed technology for joining sheets of material. The package may be constructed with more than one outer seam, for example, outer seams formed on two sides, three sides or four sides or more as the shape of the package allows.

In some examples, the package may include a non-expansion chamber. The non-expansion chamber may provide for relatively flat regions on the package. For example, the non-expansion chamber may provide a label region on the top portion of package. In such examples, the label region can be any suitable size and will generally be at least large enough to display shipping information, such as for example, a 4 inch by 6-inch standard shipping label. The inner sheet 12 may be joined to the secondary inner sheet 23 in at least the area of the outer seam. The inner sheet 12 and the secondary inner 23 may be joined to form one or more primary expansion chambers. The primary expansion chamber may be in an expanded or inflated configuration where an expansion material has been provided into the primary expansion chamber. The expansion material may increase the spacing between the sheets forming the volume of the primary expansion chamber(s) such that the expanded primary expansion chamber(s) may each have a volume that is greater than the primary expansion chamber(s) volume when not filled with the expansion material. The primary expansion chamber(s) may be inflated to provide structure to the package and to stretch outer sheet and secondary outer sheet such that the label region may be provided on the top portion of package. The primary expansion chamber(s) also may provide structural rigidity, mechanical protection and/or shape to the package when in an expanded configuration. They may also help to restrain any articles placed into the package.

The secondary outer sheet 16 may be joined to the outer sheet 14, the inner sheet 12, and the secondary inner sheet 23 (if included), in at least the area of the outer seam. The secondary outer sheet 16 and outer sheet 14 may be joined to form at least one secondary expansion chamber. The secondary expansion chamber may be in an expanded configuration where a secondary expansion material has been provided into the secondary expansion chamber. The secondary expansion material may increase the spacing between the sheets forming the volume of the secondary expansion chamber(s) such that the expanded secondary expansion chamber(s) each have a volume that is greater than the secondary expansion chamber(s) volume when not filled with the secondary expansion material. The secondary expansion chamber(s) can provide an outer frame to package and also may provide structural rigidity, mechanical protection, and/or shape to the package, when in an expanded configuration. The package can be designed such that secondary expansion chambers form supports for the package.

The sheets, including any or all of the inner sheet 12, the secondary inner sheet 23 (if included), the outer sheet 14 and/or the secondary outer sheet 16 can be joined to each other in any number of places creating any number, shape and size of expansion chambers. The primary and/or secondary expansion chamber seams can be of any length, width and shape. The primary and/or secondary expansion chamber seams can be formed by any suitable method or material. For example, the seams may be formed by glue, heat (e.g., ultrasound, conductive sealing, impulse sealing, ultrasonic sealing, or welding), mechanical crimping, sewing, or by any other known or developed technology for joining sheets of material. The seams can be continuous or intermittent, can be straight or curved, and can be permanent or temporary. The shape of the seams can be used to form the shape of the expansion chambers alone or in addition to other structural elements. For example, the secondary expansion chambers can be shaped by the secondary expansion chamber seams in combination with additional materials disposed within the secondary chambers or joined thereto. Further, chambers can be shaped by the use of chemical or mechanical modifications to the materials forming the sheets. For example, a portion of the inner sheet, secondary inner sheet, outer sheet and/or secondary outer sheet may be heated, ring-rolled, chemically treated or modified to make it more or less flexible, extensible, non-extensible, stronger, weaker, shorter, or longer than prior to treatment.

The expansion chamber(s) can have various shapes and sizes. Part, parts, or about all, or approximately all, or substantially all, or nearly all, or all of the expansion chamber(s) can be straight, curved, angled, segmented, or other shapes, or combinations of any of these shapes. Part, parts, or about all, or approximately all, or substantially all, or nearly all, or all of an expansion chamber can have any suitable cross-sectional shape, such as circular, oval, square, triangular, star-shaped, or modified versions of these shapes, or other shapes, or combinations of any of these shapes. An expansion chamber can have an overall shape that is tubular, or convex, or concave, along part, parts, or about all, or approximately all, or substantially all, or nearly all, or all of a length. An expansion chamber can have any suitable cross-sectional area, any suitable overall width, and any suitable overall length. An expansion chamber can be substantially uniform along part, parts, or about all, or approximately all, or substantially all, or nearly all, or all of its length, or can vary, in any way described herein, along part, parts, or about all, or approximately all, or substantially all, or nearly all, or all of its length. For example, a cross-sectional area of an expansion chamber can increase or decrease along part, parts, or all of its length.

The package also may include one or more expansion ports 50, 51 that may be provided to allow a user to direct an expansion material into one or more of the primary expansion chambers and the secondary expansion chambers. For example, the expansion ports 50, 51 may be openings between layers of the materials forming the package or may be an opening in any one or more layers that provides fluid communication to one or more of expansion chambers. In one example, a portion of the inner sheet 12 and the outer sheet 14 may remain unjoined to allow the user to introduce an expansion material into the primary expansion chamber. Additionally, or alternatively, materials or structures can be placed in desired locations between the sheets to provide the expansion ports 50, 51. For example, a valve may be located between two of the sheets before or after they are joined to provide the expansion ports 50, 51 through which an expansion material may be introduced into the one or more expansion chambers.

Referring again to FIG. 1, the blank 110 includes a first expansion port 50 and a second expansion port 51. Any one or more expansion ports 50, 51 may be in fluid communication with any one or more expansion chambers and multiple expansion ports 50, 51 may be in fluid communication with any one or more expansion chambers. For example, it may be desirable for a single expansion port (e.g., 50 or 51) to allow for introduction of an expansion material into all of the expansion chambers in the package. It may also be desirable for a single expansion port (e.g., 50 or 51) to allow for introduction of an expansion material into only some of the expansion chambers in the package, such as for example those on one side of the package or those formed between only the same sheets (e.g., inner sheet 12 and outer sheet 14). Further still, several expansion chambers may have different expansion ports (e.g., 50, 51) to allow for individual expansion of the chambers. Individual expansion can be beneficial when different expansion pressures are desired for different expansion chambers and/or if the expansion chambers will be expanded at different times or with different equipment. Thus, in one example, the primary expansion chambers may be expanded by providing a primary expansion material into the primary expansion chamber, such as via a first expansion port 50. The secondary expansion chambers may be expanded by providing a secondary expansion material into the secondary expansion chamber, such as via a second expansion port 51. It will be appreciated that the secondary expansion material may be the same or a different material, or provided at a same or different volume or pressure, than the primary expansion material used to expand the primary expansion chamber(s).

In accordance with the above, if more than one primary expansion chamber is provided, the primary expansion chambers may be independent from each other (e.g., discrete) or in fluid communication with each other, depending on the desired characteristics of the package. Similarly, if more than one secondary expansion chamber is provided, the secondary expansion chambers may be independent from each other (e.g., discrete) or in fluid communication with each other, depending on the desired characteristics of the package. The primary expansion chambers and secondary expansion chambers may also be independent from each other or in fluid communication with each other, depending on the desired characteristics of the package.

It may be desirable for the pressure in the chambers to be equal or different from each other. Further, where the package includes more than one primary expansion chamber and/or more than one secondary expansion chamber, it may be desirable that any one of the one or more primary expansion chambers be expanded to a different pressure than any one or more of the remaining primary expansion chambers and/or one or more of the secondary expansion chambers. Adjusting the pressure in different expansion chambers can provide the benefit of strengthening portions of the package (e.g., the expansion chambers that create a frame for the package), but allow for more flexible expansion chambers to be disposed, for example, in contact with the articles in the article reservoir. Examples include but are not limited to configurations where the primary expansion chambers have a higher internal pressure than the secondary expansion chambers, or vice-versa. Some specific, but non-limiting examples include where at least one of the primary expansion chamber(s) have an internal pressure of from about ambient pressure to about 25 psig, from about 1 psig to about 20 psig, about 2 psig to about 15 psig, about 3 psig to about 8 psig, or about 3 psig to about 5 psig, and at least one of the secondary expansion chamber(s) have an internal pressure of from about ambient pressure to about 25 psig, from about 1 psig to about 20 psig, about 2 psig to about 15 psig, about 3 psig to about 10 psig, about 4 psig to about 10 psig or about 5 psig to about 10 psig, or about 7 psig to about 9 psig. In one example, one or more of the primary expansion chamber(s) may have an internal pressure of between about 2 psig to about 8 psig or about 3 psig to about 5 psig and one or more of the secondary expansion chamber(s) may have an internal pressure of between about 5 psig and about 10 psig or about 7 psig to about 9 psig. In another example, one or more of the primary expansion chamber(s) may have an internal pressure of between ambient pressure to about 3 psig, or about 1 psig to about 3 psig, and one or more of the secondary expansion chamber(s) may have an internal pressure of between ambient pressure to about 25 psig, or about 5 psig to about 15 psig, and the chambers may differ in pressure from about 5 psig to about 25 psig. In one example, the one or more of the primary expansion chamber(s) may have an internal pressure of between ambient pressure to about 5 psig, or about 1 psig to about 4 psig, or about 3.5 psig, and one or more of the secondary expansion chamber(s) may have an internal pressure of between ambient pressure to about 15 psig, or about 5 psig to about 10 psig, or about 8 psig to 9 psig, and the chambers may differ in pressure from about 3 psig to about 10 psig. In one example, the one or more of the primary expansion chamber(s) may have an internal pressure of between ambient pressure to about 2 psig, and one or more of the secondary expansion chamber(s) may have an internal pressure of between ambient pressure to about 15 psig, or about 5 psig to about 15 psig, or about 8 psig to 12 psig, and the chambers may differ in pressure from about 3 psig to about 10 psig. The pressure ratio of the average pressure of the one or more primary expansion chamber(s) to the average pressure of the one or more secondary expansion chamber(s) can be any suitable ratio, such as, for example, about 1:15, about 1:10, about 1:8, about 1:5, about 1:3, about 1:2, to about 1:1. In some packages, the pressure of the one or more primary expansion chamber(s) and the pressure of the one or more secondary expansion chamber(s) may be both above ambient pressure. In some packages, the pressure of the one or more secondary expansion chamber(s) may be above ambient pressure and the one or more primary expansion chamber(s) may conform to the article.

Figure 2:
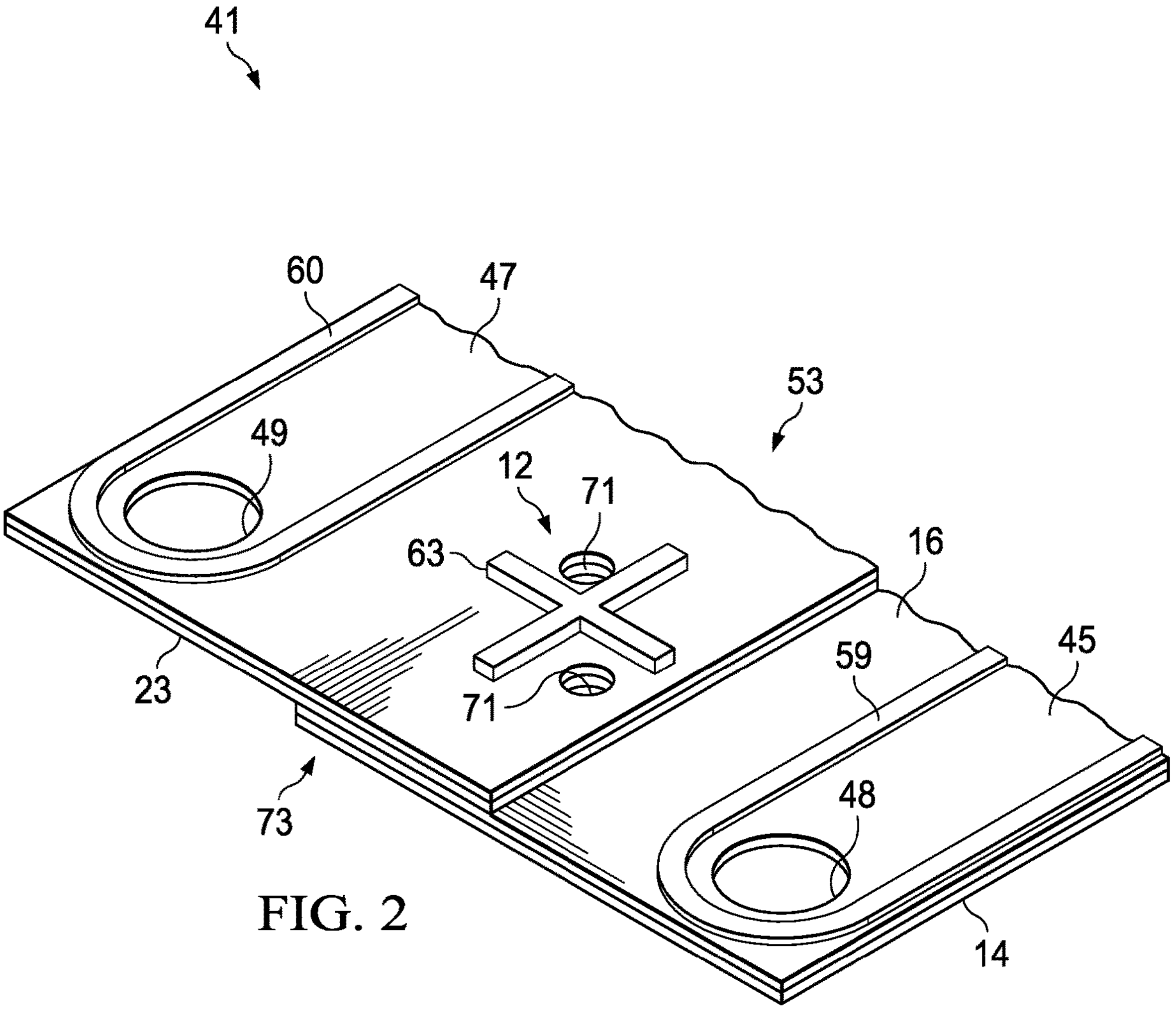
FIG. 2 depicts an isometric view of the inflation feature of FIG. 1.

FIGS. 1 and 2 depict the inflation feature 41. As described above, the inflation feature may be formed from sheet extensions contiguous with the sheets comprising the package. For example, as shown in FIGS. 1 and 2, the inflation feature may be formed from the four-layer assembly and extend from the body 43 of the shipping package, adjacent the first expansion ports 50 and the second expansion port 51, which are in fluid communication with one or more expansion chambers. While the inflation feature 41 is shown in FIG. 1 to be at a short edge of the blank 110, it will be appreciated that an inflation feature may be located at other suitable positions along a perimeter of the blank 110. As shown in FIGS. 1 and 2, the inflation feature 41 may include a first inflation port 45 and a second inflation port 47. The first inflation port 45 is in fluid communication with the first expansion port 50 and the second inflation port 47 is in fluid communication with the second expansion port 51. While the inflation feature 41 of FIGS. 1 and 2 is shown to include two inflation ports in fluid communication with two expansion ports, it will be appreciated that in other examples, an inflation feature may include one, three, or more inflation ports. Further, it will be appreciated that multiple inflation ports can be in fluid communication with a single expansion port, a single inflation port can be in fluid communication with multiple expansion ports, and multiple inflation ports can be in fluid communication with multiple expansion ports.

The inflation ports 45, 47 may be in fluid communication with expansion ports 50, 51 at a first end, and at a second end, the inflation ports 45, 47 may define an aperture that is configured to receive a nozzle or other fixture in fluid communication with an expansion material source for inflation or expansion of the expansion chambers. However, it will be appreciated that the inflation feature 41 can similarly facilitate fluid communication between expansion chambers and a vacuum for extraction of an expansion material. As shown in FIG. 2, the first inflation port 45 may define a first aperture 48 and the second inflation port 47 may define a second aperture 49. The apertures 48, 49 can be defined by a top surface 53. In particular, the first aperture 48 can be defined by the secondary outer sheet 16 and the second aperture 49 can be defined by the inner sheet 12. However, it will be appreciated that in other examples, apertures can be defined by any of an inner sheet, a secondary inner sheet, an outer sheet, a secondary outer sheet, or other sheet in any of a variety of suitable configurations. For example, while FIG. 2 shows apertures 48, 49 defined by the top surface 53, it will be appreciated that apertures, when provided, can be defined by a top surface, a bottom surface, or both. That is, in one example, one aperture can be defined by the top surface and another aperture can be defined by on the bottom surface. As noted when discussing the “top” and “bottom” of the package, the terms “top” and “bottom” are not intended to be limiting, but rather merely to help more clearly distinguish parts of the inflation feature from each other.

The inflation ports 45, 47 are configured to receive the expansion material (e.g., compressed air) therethrough. For example, as the expansion ports 50, 51 may be provided to allow a user to direct an expansion material into one or more of the primary expansion chambers and the secondary expansion chambers, the inflation ports 45, 47 may be provided to allow a user to direct an expansion material into the expansion ports 50, 51 to facilitate expansion or inflation of the one or more expansion chambers. For example, the inflation port may allow the user to more readily find and access an entry point for the expansion material into the expansion ports 50, 51. In particular, such a configuration may reduce fulfillment times by saving a user from having to locate the expansion ports 50, 51 and/or separate sheets to access the same. While the apertures 48, 49 are shown in FIGS. 1 and 2 to be circular and substantially identical, it will be appreciated that apertures can be the same or different from each other and provided in any suitable size or shape to effectively receive an expansion material. Further, while the apertures 48, 49 are shown in FIGS. 1 and 2 to be holes in alignment with each other, relative to the body 43, and having perimeters fully defined by their respective sheets, it will be appreciated that apertures can be provided in any suitable configuration to effectively receive an expansion material and/or correspond to an inflation rig assembly, as described herein. For example, in other examples, apertures can be offset. Further, in other examples, apertures can instead be adjacent to a sheet edge, such that only a portion of a perimeter is defined thereby, or otherwise defined by sheet edges. Apertures may further comprise one or more one-way valves. It will be appreciated that in certain embodiments, an inflation feature may be provided with inflation ports free of apertures. In one such example, such inflation ports can be configured to allow for puncturing, for example, at a second end of the inflation port to receive a nozzle or other fixture in fluid communication with an expansion material source for inflation or expansion of the expansion chambers.

As shown in FIGS. 1 and 2, a perimeter for the first inflation port 45 and the second inflation port 47 may be defined by a first border seal 59 and a second border seal 60, respectively. The first border seal 59 can join the outer sheet 14 with the secondary outer sheet 16 and the second border seal 60 can join the inner sheet 12 with the secondary inner sheet 23. The border seals 59, 60 may be formed by glue, heat (e.g., ultrasound, conductive sealing, impulse sealing, ultrasonic sealing, or welding), mechanical crimping, sewing, or by any other known or developed technology for joining sheets of material. In such examples, the border seals 59, 60 can facilitate the direction of an expansion material into the expansion ports 50, 51. The border seals 59, 60 may be formed simultaneously with the primary and/or secondary expansion chamber seams or separately therefrom.

The inflation feature 41 can further include one or more joint seals 63, as shown in FIGS. 1 and 2, to join one or more of the inner sheet 12, the secondary inner sheet 23, the outer sheet 14, and the secondary outer sheet 16. The joint seal 63 may help to maintain alignment of the sheets of the inflation feature 41 throughout an inflation process. In some examples, to ensure such alignment, the joint seal 63 is preferably centrally positioned on the inflation feature 41, such that all four sheets are joined. For example, the joint seal 63 may be positioned between the first inflation port 45 and the second inflation port 47. Like the border seals 59, 60, the join seals 63 may be formed by glue, heat (e.g., ultrasound, conductive sealing, impulse sealing, ultrasonic sealing, or welding), mechanical crimping, sewing, or by any other known or developed technology for joining sheets of material. While the inflation feature 41 of FIGS. 1 and 2 is shown to include one plus-sign-shaped joint seal 63, centrally positioned thereon, it will be appreciated that one joint seal or multiple joint seals may be provided in any of a variety of suitable shapes and configurations in any of a variety of suitable positions on an inflation feature. The joint seal 63 may be formed simultaneously with the primary and/or secondary expansion chamber seams or separately therefrom. It will also be appreciated that a joint seal may be formed simultaneously with border seals or separately therefrom. Further, it will be appreciated that a joint seal and border seals may be formed as a single seal.

Figure 8:
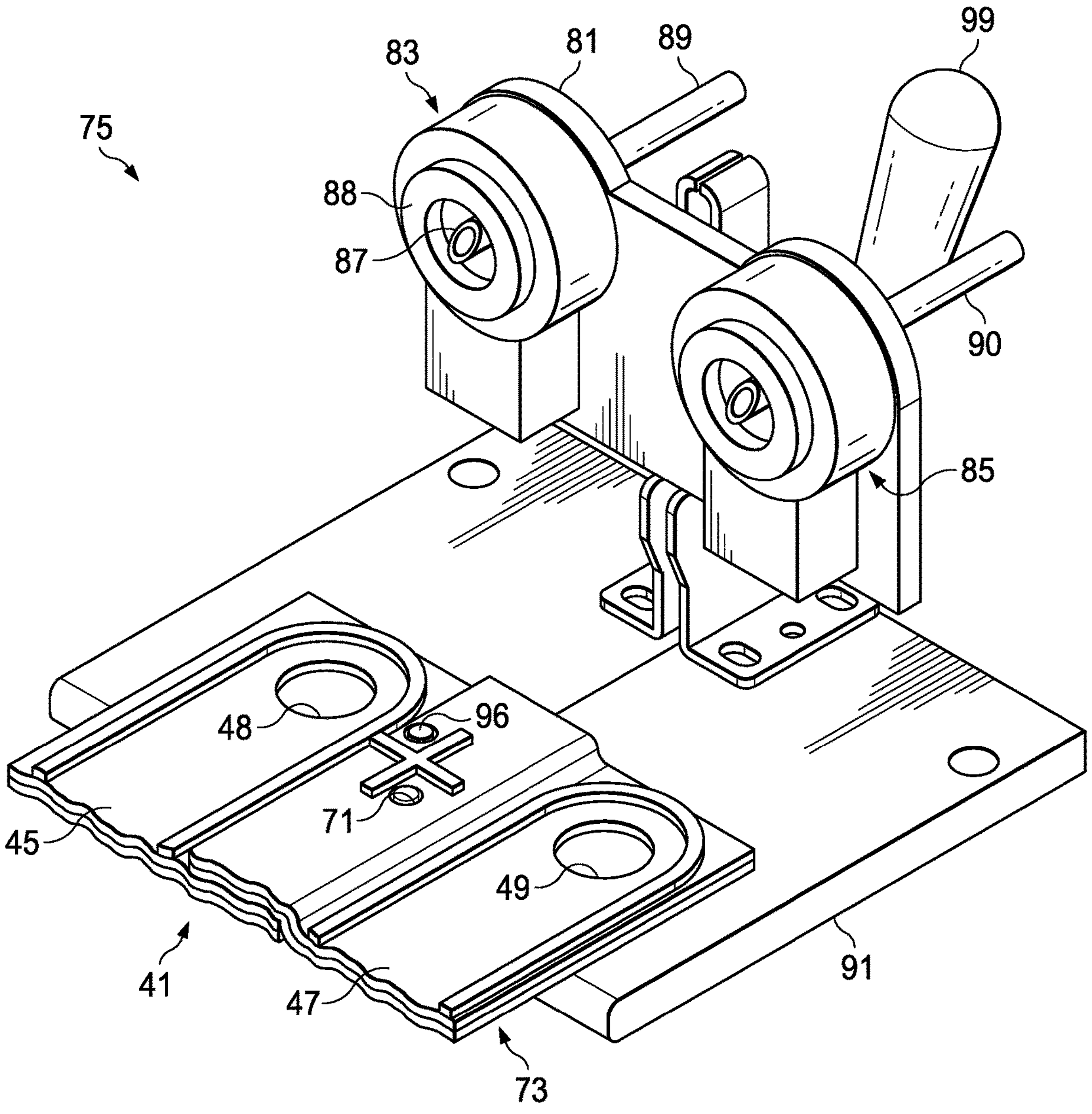
FIG. 8 depicts an isometric view of the inflation rig assembly of FIG. 3 in the first position with the inflation feature of FIG. 1 positioned on a base plate thereof.
Figure 9:
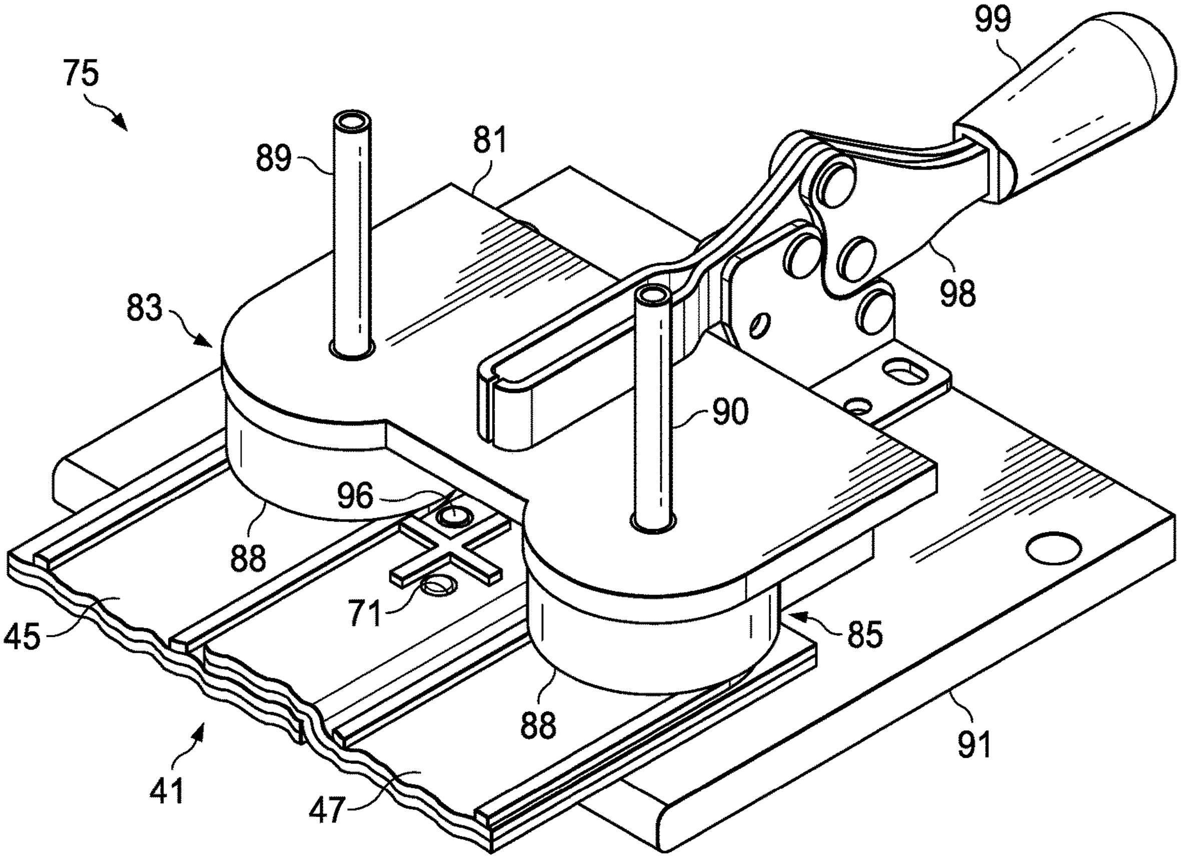
FIG. 9 depicts an isometric view of the inflation rig assembly of FIG. 3 in the second position with the inflation feature of FIG. 1 positioned on the base plate thereof.

The inflation feature 41 can further include one or more primary alignment features (e.g., 71) configured to facilitate positioning of the shipping package on an inflation rig assembly 75 for inflation (e.g., as in FIGS. 8 and 9). In particular, the primary alignment features (e.g., 71) can correspond to complementary alignment features (i.e., secondary alignment features) on the inflation rig assembly 75 for positioning on the same. In some examples, the primary alignment features (e.g., 71) can facilitate positioning and securement of the inflation feature 41 to the inflation rig assembly 75. For example, FIGS. 1 and 2 depict the inflation feature 41 having two offset holes 71, extending through the top surface 53 and bottom surface 73. The offset holes 71 may be configured for placement over corresponding protrusions (e.g., pins 96) on the inflation rig assembly 75 to ensure securement of the inflation feature 41 to the inflation rig assembly 75 as well as proper positioning and orientation of the inflation feature 41 for inflation or expansion of the expansion chambers. However, it will be appreciated that, in other examples, a configuration of holes or other primary alignment features can be symmetrical, especially where no particular orientation is required for the blank 110. In some examples, like the joint seal 63, the primary alignment features (e.g., 71) may be centrally positioned on the inflation feature 41. For example, each of the offset holes 71 shown in FIGS. 1 and 2 extend through all four sheets of the inflation feature 41. Additionally, in some examples, like that shown in FIGS. 1 and 2, the one or more primary alignment features (e.g., 71) may be positioned adjacent to the joint seal 63. In other examples, the one or more primary alignment features (e.g., 71) may be formed entirely within the joint seal 63.

While the primary alignment features of the inflation feature 41 of FIGS. 1 and 2 are two offset holes 71, centrally positioned thereon, it will be appreciated that primary alignment features may be provided in any of a variety of suitable shapes and configurations and in any suitable amounts and sizes and in any of a variety of suitable positions on an inflation feature. For example, other suitable primary alignment features may include one or more of grooves, rails, notches, impressions, depressions, ridges, pins, protrusions, lines, dots, images, heat seals, and icons. In some examples, the primary alignment feature may be a fiducial or "eye mark." In other examples, the primary alignment feature may be formed as a seam by any means of forming a seam disclosed herein. The primary alignment feature may be formed simultaneously with any of the other seams and/or seals discussed herein (i.e., expansion chamber seams). As further described herein, the one or more primary alignment features (e.g., 71) may be configured for alignment with complementary alignment features (i.e., secondary alignment features) on the inflation rig assembly 75 by a human operator and/or through automated operations.

Typically, after the user introduces the expansion material through the inflation ports 45, 47 and the expansion ports 50, 51, the inflation ports and/or the expansion ports may be temporarily or permanently closed to prevent the escape of the expansion materials from the expanded chambers. A pressure source may remain in fluid communication with the expanded chambers throughout an operation that closes and/or seals the inflation ports 45, 47 and/or the expansion ports 50, 51 to help maintain the desired pressure in the expansion chambers. Any means can be used to close or seal the inflation ports 45, 47 and/or the expansion ports 50, 51, including those described herein with respect to making chamber seams, joint seams, border seams, etc., as well as any other method suitable for closing the particular inflation ports 45, 47 and/or expansion ports 50, 51 that are used. The inflation ports 45, 47 and/or the expansion ports 50, 51 may be hermetically sealed closed or not, depending on the desired end use of the package. Further, the inflation ports 45, 47 and/or the expansion ports 50, 51 may include a closure other than a seal, such as, for example, a valve, a cap, a material to hold the inflation ports 45, 47 and/or expansion ports 50, 51 closed, such as an adhesive, or any other closure or closure means. The closure may be single use (e.g., once closed, can't be opened without damaging the package, expansion port 50, 51 or closure) or disposable, or may be reusable, such as a threaded cap or friction-fit plug or other closure that can be reused one or more times.

In any configuration, it may be desirable to include one or more vents in fluid communication with the article reservoir to allow the vacuum to be applied and/or to allow fluid to escape the article reservoir during or after the expansion of the primary expansion chamber(s). The vent can be sealed after the package is fully constructed or it can remain partially or fully open to allow for fluid flow into and/or out of the article reservoir. The vent can be configured to be self-sealing or can be sealed by some separate step and/or tool. The vent can, for example, include a valve and can be one-way or two-way. That is, it can allow fluid to flow in both directions (in and out) or just one direction. One or more vents can also be provided to allow fluid flow to or from other portions of the package, as desired.

In certain examples, the shipping package can include an evacuation feature. Similar to an inflation feature, the evacuation feature can have a top surface and a bottom surface and may be formed from any adjacent sheets of the four-layer, three-layer, or two-layer assembly and extend from the body 43 of the shipping package, adjacent with one or more reservoir ports in fluid communication with the reservoir. In such examples, one or more reservoir ports can be provided instead of the one or more vents. The evacuation feature may include one or more evacuation ports which are in fluid communication with the reservoir ports. Suitable configurations for the one or more evacuation ports and the one or more reservoir ports may be in accordance with at least those configurations described above for the inflation ports and expansion ports, respectively, with respect to the inflation feature. For example, the evacuation ports may be in fluid communication with reservoir ports at a first end, and at a second end, the evacuation ports may define an aperture that is configured to receive a nozzle, tube, or other fixture in fluid communication with a vacuum for evacuation of the reservoir. It will be appreciated that aperture configurations and alternatives relating to the evacuation port may be in accordance with at least those configurations described above for the inflation ports of the inflation feature.

In some examples, the evacuation ports are configured to receive contents (e.g., air) pulled from the reservoir by the vacuum to facilitate isolation and/or immobilization of the article within the reservoir. Upon evacuation, the internal pressure in the reservoir can range from about −14.7 psig to ambient pressure, from about −14 psig to about 1 psig, from about −13 psig to about −2 psig, from about −12 psig to about −3 psig, from about −11 psig to about −4 psig, from about −10 psig to about −5 psig, and from about −9 psig to about −6 psig. It will be appreciated that the evacuation port configurations provided for the evacuation feature may be in accordance with at least those configurations described above for the inflation ports of the inflation feature, particularly with respect to formation of the same and seals and closures relating to the same. Moreover, as described for the inflation feature, it will be appreciated that the evacuation feature may include one or more primary alignment features configured to facilitate positioning of the shipping package on, for example, a vacuum rig assembly, where the one or more primary alignment feature may correspond to complementary alignment features (i.e., secondary alignment features) on the vacuum rig assembly for positioning on the same. It will further be appreciated that the inflation rig assembly and the vacuum rig assembly may be the same device, connectable to one or both of an expansion material source and a vacuum. The package can include one or more closeable openings through which one or more articles may be placed into the article reservoir. The closeable opening is preferably an unjoined portion of the sheets making up the article reservoir. For example, the inner sheets 12 at one end of the package may be left unjoined across all or a portion of the width of the package to form the closeable opening. The closeable opening may be located anywhere on the package and may be configured to best meet the needs of the user. For example, if a larger opening is needed, the closeable opening may be disposed along a side edge 11. Also, the closeable opening may be provided through one or more of the sheets making up the package. At a minimum, the closeable opening should provide access to the article reservoir prior to being closed. This allows the user to place the one or more articles in the article reservoir before shipping. In an alternative execution, the article(s) may be placed in the reservoir prior to any of the sheets being joined together or after some, but not all of the sheets are joined together.

The closeable opening may be any size desired by the user and can include any type of closure mechanism or material, if a closure mechanism/material is used. For example, the closeable opening may include an adhesive, mechanical closure, magnets, clips, folding closure device or any other closure mechanism desired by the user. In one example, the closure mechanism can be joined to the package at the closeable opening or any other part of the package or may be separate therefrom. The closure mechanism may be a single-use mechanism or may be reusable. Examples of closure mechanisms include, but are not limited to hook and loop fasteners, zippers, buttons, tapes, adhesives, magnetic strips, sewing, bands, interference-type fasteners, framed openings, and any other types of closure mechanisms suitable for the particular use of the package.

Where a distinct closure mechanism is not used, the closeable opening may be closed by sealing the materials located in the region of the closeable opening. Such sealing can be done using heat, chemicals (e.g., adhesives), friction, static, sound, or other sources to close the closeable opening. It is also possible to provide additional materials in the location of the closeable opening to help provide the desired closure. For example, additional materials with different melting temperatures or strength profiles may be provided. Also, materials like particles, metals, magnets and others may be provided in the area of the closeable opening to allow for sealing of the materials with different equipment and processes. Additionally, or alternatively, the closeable opening may be closed by expanding one or more of the expansion chambers.

The closeable opening may be configured to be reusable (i.e., can be open and closed more than one time) or may be a single-use-type opening. Other features may also be included to help make the package more user-friendly. For example, the closeable opening may be a different color from the rest of the package or may include texture, indicia or other features to make it more readily apparent to the user. Also, the closeable opening may have a sheet, coating or other material therein to help the user open the closeable opening when it is time to insert the article(s).

The closeable opening may be configured such that it can be closed at the same time and/or with the same equipment as one or more of the inflation ports 45, 47 and/or expansion ports 50, 51. For example, the package can be configured such that the closeable opening can be heat seal closed at the same time one or more of the inflation ports 45, 47 and/or the expansion ports 50, 51 is heat seal closed. Alternatively, the closeable opening can be configured to be closed at a different time than the inflation ports 45, 47 and/or expansion ports 50, 51 and/or by different means. Thus, the article(s) can be placed in the package and the closeable opening be closed at a time different than the expansion of the expansion chambers. This may allow for better overall results, for example, if the article must be protected from dust, but the package can't be finally expanded for shipment until a time and/or location different from when and where the article is placed in the package. In such situations, the closeable opening can be closed after the article is placed in the article reservoir and need not wait to be closed until the expansion chambers are expanded for shipment.

Although the package described in the example above has four sheets, inner sheet 12, secondary inner sheet 23, outer sheet 14, and secondary outer sheet 16, joined together to form the package, any number of sheets can be used depending on the desired end structure of the package. Different numbers of sheets could be used to provide additional strength, decoration, protection and/or other characteristics. In one example, a sleeve can be applied over the package to provide one or more of such features. Suitable sleeves can be provided, for example, as described in U.S. Patent Publication No. 2020/0024058, which is incorporated herein by reference.

The package in its expanded configuration or inflated state has an expanded thickness. The expanded thickness may be significantly larger than the unexpanded thickness. In some examples, the package can be manufactured, shipped, and stored in an unexpanded state and then expanded only when needed. This may allow for significant efficiencies in terms of handling and storing the packages before use. The same may be true of the package at an end of a shipping lifecycle. Whether it is intended to be reused or discarded, the package can be deflated from its expanded state to a deflated state before or after the article is removed from the reservoir. As used herein, the term "deflated" means any pressure from an expansion material that is causing an expansion chamber to expand has been released. A "deflated state" is when the package has been expanded by introduction of an expansion material into one or more expansion chambers, but then the expansion chambers have been opened or otherwise made to be in fluid communication with the surrounding atmosphere and the expansion chambers are all in a state of equilibrium with respect to pressure of the surrounding atmosphere. Any measurements made of a package in a deflated state should be made without any articles in an article reservoir unless otherwise set forth herein.

In some examples, the package may include one or more article retrieval features and/or one or more chamber deflation features. The article retrieval feature may be used to open the package so that the end user can retrieve the article(s) from the article reservoir. The chamber deflation feature may be used to deflate one or more of the primary or secondary expansion chambers. As used here, "chamber deflation feature" is used to describe any feature that is used to deflate an expansion chamber, and can include a chamber deflation feature or a combined article retrieval and chamber deflation feature. Examples of chamber deflation features include, but are not limited to tear strips; tools to puncture one or more layers of the package; openable closures such as, for example, screw on caps, snap on caps, adhesive closures, mechanical closures; and other closure means and mechanisms. Another example includes providing a sticker or other cover material over a hole or vent in one or more of the expansion chambers that can be removed to release the expansion material. Article retrieval features and/or one or more chamber deflation features can be provided as described in U.S. Patent Publication No. 2020/0024050 and U.S. Provisional Patent Application No. 62/989,135, which are incorporated herein by reference.

The package may optionally include one or more transfer holes. Transfer holes may be formed during a singulation process and may be provided for purposes of locating and/or transporting the package blanks. For example, package blanks may be located for product filling, inflation, and/or formation of various seals. Transfer holes may be laser cut. In some examples, package blanks can be held by and/or transferred by rod-shaped projections that are substantially thinner than the diameter of the transfer holes. Transfer holes can be provided as described in U.S. Patent Publication No. 2019/0352068, which is incorporated herein by reference.

In some examples, the inflation feature 41 may be removable. For example, the package and/or inflation feature 41 may further include a removal means to allow the inflation feature 41 to be removed from the package after fulfillment of the package from the inflation feature 41. Suitable examples of removal means can include one or more of perforations, lines or weakness, tear-lines, and tear-strips.

The package can be made from a variety of materials. Such materials may include, for example and without limitation, films, woven materials, non-woven materials, paper, foil, and/or any other flexible materials. In fact, an advantage of the package of the present invention is that it can be made substantially, almost entirely or entirely from flexible sheets but still provide the rigidity, strength and protection needed to successfully and economically ship consumer products through established parcel and mail delivery systems. For example, the package may comprise or be manufactured only of one or more sheet materials without the need for additional rigid interior or exterior elements, such as wood, metal, solid foam or rigid plastic or a paperboard box, to provide shape and/or structure to the package. Stated differently, the package may consist of, or consist essentially of flexible materials. This can be advantageous for both manufactures and consumers as flexible materials such as sheets of film are often easier to handle, ship and store than more bulky items like paperboard boxes and other structural packaging members.

Examples of materials that can be flexible materials include one or more of any of the following: films (e.g., plastic films), elastomers, foamed sheets, foils, fabrics (including wovens and nonwovens), biosourced materials, and papers, in any configuration, as separate material(s), or as layer(s) of a laminate, or as part(s) of a composite material, in a microlayered or nanolayered structure, and in any combination, as described herein or as known in the art. For example, a flexible material may be a laminate of a paper to a polyvinyl alcohol (PVOH) material.

If films are used, the films may include, for example, polyethylene (e.g., high-density polyethylene, linear low-density polyethylene), polyester, polyethylene terephthalate, nylon, polypropylene, polyvinyl chloride, ethylene vinyl alcohol (EVOH), and the like. In one example, the flexible material may be formed from multiple types of polyethylene for improved heat sealability at low temperatures while still having higher tensile strength. The sheets may include and/or be coated with a dissimilar material. Examples of such coatings include, without limitation, polymer coatings, metalized coatings, ceramic coatings, and/or diamond coatings. The sheets may be plastic film having a thickness such that the sheets are compliant and readily deformable by an application of force by a human. The thicknesses of the inner, secondary inner, outer and secondary outer sheets 12, 23, 14 and 16, respectively, may be approximately equivalent. Alternatively, the thicknesses of the sheets may be different.

The materials making up the sheets may be laminates that include multiple laminated layers of different types of materials to provide desired properties such as strength, flexibility, the ability to be joined, and the ability to accept printing and/or labeling. The materials, for example, may have a thickness that is less than about 200 microns (0.0078 inches). One example of a film laminate includes a tri-layer low-density polyethylene (LDPE)/Nylon/LDPE with a total thickness of 0.003 inches.

Other types of laminate structures may be suitable for use as well. For example, laminates created from co-extrusion, or coat extrusion, of multiple layers or laminates produced from adherent lamination of different layers. Furthermore, coated paper film materials may be used. Additionally, laminating nonwoven or woven materials to film materials may be used. Other examples of structures which may be used include, but are not limited to: 48 ga polyethylene terephthalate (PET)/ink/adh/3.5 mil ethylene vinyl alcohol (EVOH)-Nylon film; 48 ga PET/Ink/adh/48 ga MET PET/adh/3 mil PE; 48 ga PET/Ink/adh/0.00035 foil/adh/3 mil PE; 48 ga PET/Ink/adh/48 ga SiOx PET/adh/3 mil PE; 3.5 mil EVOH/PE film; 48 ga PET/adh/3.5 mil EVOH film; and 48 ga MET PET/adh/3 mil PE.

The sheets may be made from sustainable, bio-sourced, recycled, recyclable, and/or biodegradable materials. Non-limiting examples of renewable polymers include polymers directly produced from organisms, such as polyhydroxyalkanoates (e.g., poly(beta-hydroxyalkanoate), poly(3-hydroxybutyrate-co-3-hydroxyvalerate, NODAX™), and bacterial cellulose; polymers extracted from plants and biomass, such as polysaccharides and derivatives thereof (e.g., gums, cellulose, cellulose esters, chitin, chitosan, starch, chemically modified starch), proteins (e.g., zein, whey, gluten, collagen), lipids, lignins, and natural rubber; and current polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

The sheets making up the package may be provided in a variety of colors and designs. Additionally, materials forming the sheets may be pigmented, colored, transparent, semitransparent, or opaque. Such optical characteristics may be modified through the use of additives or masterbatch during the film making process. Any of the materials comprised in the package may be pre-printed with artwork, color, and or indicia before or after forming the package blank using any printing methods, including but not limited to gravure, flexographic, screen, ink jet, laser jet, digital printing and the like. Additionally, the assembled package may be printed after forming the package blank and/or after forming the package (e.g., by inflating the package blank) using any suitable method, including but not limited to digital, laser jet and ink-jet printing. The printing can be surface printing and/or reverse printing. Any and all surfaces of the package may be printed or left unprinted. Additionally, other decoration techniques may be present on any surface of the sheets such as lenses, holograms, security features, cold foils, hot foils, embossing, metallic inks, transfer printing, varnishes, coatings, and the like. Any one or all of the sheets may include indicia such that a consumer can readily identify the nature of the product, or any given property of the product, held in the article reservoir of the package, along with the brand name of the producer of the product held in the package, the sender of the package, or any third-party such as a sponsor of either the producer of the product or the sender of the package. The indicia may contain decorative elements and/or may provide information or instructions on use of the product and/or package or other information that may be useful, for example, to the user, shipper, recycler or other party interacting with the package.

As noted, any indicia, printing, decoration, information or the like may be disposed on any portion of any material or materials that make up a portion of the package. For example, indicia may be disposed on one or more of the inner sheet 12, the secondary inner sheet 23, the outer sheet 14, and the secondary outer sheet 16. In some examples, indicia may be visible when viewing, for example, the top of the package. However, secondary outer sheet indicia may be disposed on the secondary outer sheet 16, outer sheet indicia may be disposed on the outer sheet 14, and inner sheet indicia may be disposed on the inner sheet 12. Printing or otherwise providing indicia on different materials, sheets or layers of the package can provide for unique and aesthetically pleasing and/or interesting designs for the package. For example, portions of the package may be translucent or transparent allowing indicia printed on different layers to be seen through the translucent or transparent regions. This can provide a three-dimensional look to the package that is not possible with paper, cardboard or other opaque materials. Further, transparent or translucent "windows" can be provided to allow printing or other indicia to be seen through the window. Printing and other indicia can be registered with other printing, indicia, and portions of the package, such as an article retrieval feature (e.g., tear strip), label areas, and even the product(s) disposed in the package to provide functional or aesthetic features useful or desirable by shippers, manufacturers, customers and others that may interact with the package.

Functional inks may be printed on the sheets and functional pigments and dyes can be incorporated into one or more of the materials used to form the package. Functional inks, pigments and dyes include those that provide benefits beyond decoration such as, for example and without limitation, printed sensors, printed electronics, printed RFID, light-sensitive dyes, thermochromic inks and pigments and those that provide texture or other utility such as UV blocking, protection from radiation or other environmental elements, etc.

Additionally, or in the alternative, labels, for example and without limitation, flexible labeling, or heat shrink sleeves may be applied to the sheets making up the packages or the packages themselves before or after expansion to provide the desired visual appearance of the packages. Because films can be printed flat and then formed into three dimensional objects, artwork can be designed to conform precisely to the package itself or articles therein. For example, some or all of the printing may be distorted relative to its desired finished appearance, so that the indicia acquire their desired finished appearance upon being formed into three dimensional objects. Such pre-distortion printing may be useful for functional indicia such as logos, diagrams, bar-codes, and other images that require precision in order to perform their intended function.

A variety of primary expansion materials and/or secondary expansion materials may be provided into the primary expansion chambers and secondary expansion chambers, respectively. The primary expansion material and/or secondary expansion material may be a gas, a liquid, a solid or a combination thereof. One example of a solid expansion material is a solidifying foam. Such materials can be introduced into the expansion chambers as a fluid that changes to a solid or as a solid. If a foam is used, it may be an expandable foam that increases in volume as the foam solidifies. An example of such foams includes, without limitation, a two-part liquid mixture of isocyanate and a polyol that, when combined under appropriate conditions, solidify to form a solid foam. One advantage of such an expansion material is that it may be retained within the expansion chamber(s) without the need to seal the expansion chamber(s), which can simplify the manufacturing and/or expansion chamber filling process. The expansion material may include a perfume, scent, color or have other consumer noticeable attributes that can provide aesthetic and/or functional benefits while enclosed within the expansion chambers or when released therefrom. For example, a scent can be included in the expansion material such that when one or more of the expansion chambers is deflated, the scent is released into the air. Further, an expansion material can be used that provides UV protection, insulation or another desirable function.

The expansion material may be an "expand-on-demand" material that can be expanded at any time by the user. For example, expansion of the expansion chambers may be caused by a phase change of a fluid introduced into the chambers. Examples of the phase change may include injecting a quantity of cooled material, for example and without limitation, liquid nitrogen or dry ice. By sealing the chamber from the external environment and allowing the expansion material to vaporize and/or sublimate (e.g., when reaching an ambient temperature), pressures between the sheets may cause the expansion chambers to expand. Chemically reactive materials, for example and without limitation, a weak acid, such as citric acid, to a weak base, such as sodium bicarbonate, may be introduced into the chambers and can be activated, as desired, by the user. In such configurations, the expansion materials may be introduced through the expansion ports and inflation features. It will be appreciated that, in certain examples, a package may include "expand-on-demand" material for multiple uses or to be activated at different moments.

Although the expansion material may provide any amount of expansion desired, it has been found that a pressure from about ambient pressure to about 25 psig, or from about 1 psig to about 20 psig is generally suitable for shipping packages used to ship typical consumer products. Higher or lower pressures may be desired in one or all of the expansion chambers depending on the article(s) being shipped, the method of shipment, the expected environmental conditions, such as the temperature and/or altitude to which the shipping package will be exposed.

The packages of the present invention can be configured to have any desired mechanical, chemical, environmental (e.g., temperature, humidity, light, sound, dust, atmospheric pressure, precipitation, etc.), and other performance characteristics desired. For example, the packages may include materials that resist penetration of humidity, water, light, certain chemicals, and/or gases. An advantage of the package of the present invention is that it can be configured to meet or exceed many of the most common parcel shipping requirements, for example, as set for in industry standards like ISTA performance tests, without the need for multiple different packaging materials or being difficult to construct and/or store the packages.

The package may be configured to endure the rigors of shipping through regions of changing ambient air pressure, such as transportation over mountains or shipment via air-cargo. Changes in ambient pressure may include increases in atmospheric pressure and decreases in atmospheric as well as changes in ambient pressure, such as in pressurized cargo holds. Transportation over high altitudes and/or shipment via air-cargo typically include a reduction in ambient air pressure. Such reductions in ambient pressure can result in an expansion chamber that is expanded to a pressure below its burst pressure at or near sea-level to burst during shipment. The expansion chambers may be inflated sufficiently below their burst-pressure that they do not burst during shipment at reduced ambient pressure and/or may include vents or valves to allow some or all of the expansion material packages to escape if the expansion chamber is nearing its burst pressure.

In terms of mechanical protection, the packages may be designed and configured to have properties that help protect any articles shipped therein from damage due to mechanical forces, such as dropping, stacking, puncture, squeezing, tearing, pinching, etc. As with other attributes, the package can be specifically designed to meet the needs of the user in terms of mechanical protection by choosing appropriate materials for different parts of the package, appropriately designing the shape of the package and/or appropriately expanding the one or more expansion chambers, among other things.

One of the most important mechanical damaging forces to protect against during shipping is dropping. Often packages do not provide adequate protection for dropping because they allow the articles being shipped therein to "bottom out" when dropped. Bottoming out occurs when any protective material in the package reaches its limit of protection and thus, the article therein is subjected to the a resistance force of the surface on which it is dropped that is greater than if the package had not reached its limits of protection. The packages of the present invention have been found to be particularly good at resisting bottoming out of articles shipped therein, and thus, can effectively prevent breakage and other damage to the articles. However, it will be appreciated that the expansion materials and/or expansion pressures may be selected to mitigate such damaging forces as "bottoming out" and the like.

Further, the package may include one or more thermally insulating material. A thermally insulating material is one that would result in an increase of the R-value as measured between the reservoir and the outside of the package. In one example, one or more of the expansion chambers may include a thermally insulating material. Non-limiting examples of thermally insulating materials include foams and gasses with R-values greater than air, such as, for example, noble gases such as argon.

The overall shape of the package may include at least one relatively flat portion or "face". This portion may be useful for applying shipping labels or instructions. Although not required, having a relatively flat portion may be useful in terms of handling the package through conventional shipping systems. For example, when conveying packages at angles, rounded packages have a tendency to tumble, while packages comprising relatively flat portions, edges, angles, and corners are less likely to have that disadvantage. The overall shape of the package may be roughly polyhedral. The overall shape of the package may be substantially a rectangular prism. Such shapes can also provide for better stacking, fit into conventional shipping equipment and handling.

One way to provide a generally parallelepiped shape is to include one or more gussets in the package. Gussets can help reduce the amount of material used in the package and help reduce the overall size of the package is to separate the top and the bottom from each other such that they are spaced apart when the package is expanded for use. They can also help enable products of different sizes to better fit within the package while maintaining its desired shape. Gussets can be formed in any suitable manner.

Inflation Rig Assembly

FIGS. 3-7 depict the inflation rig assembly 75 having a first portion 77 and a second portion 79. The inflation rig assembly 75 can be provided to facilitate inflation of the package. In particular, the inflation rig assembly 75 can combine with the inflation feature 41 described herein to better position and/or secure the blank 110 for inflation, and thus, to more easily and efficiently inflate and expand the package blanks to form the packages.

Figure 3:
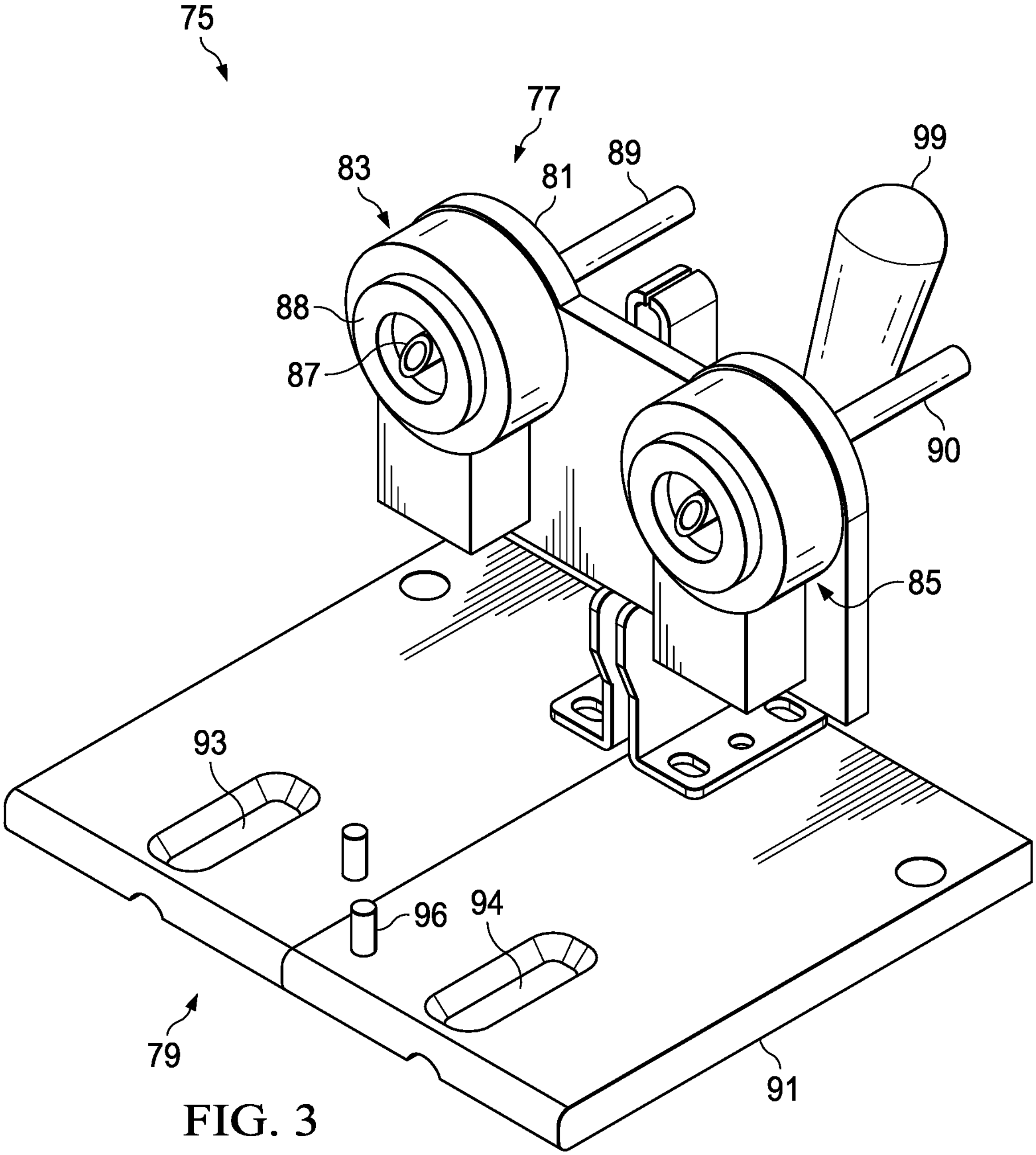
FIG. 3 depicts an isometric view of an inflation rig assembly in a first position.

The first portion 77 of the inflation rig assembly 75 may include a frame (e.g., 81) and one or more nozzle assemblies 83, 85. For example, and as shown in FIG. 3, the frame is a bracket 81 that supports a first nozzle assembly 83 and a second nozzle assembly 85, in a side-by-side configuration. As shown in FIG. 3, each of the first nozzle assembly 83 and the second nozzle assembly 85 may include a nozzle 87, a gasket 88, and an expansion material line (e.g., 89, 90). The nozzle 87 may be any known nozzle or other fixture suitable for fluid communication with an expansion material source and delivery of the expansion material (e.g., compressed air) into the inflation ports 45, 47. As shown in FIG. 3, the nozzle may be radially surrounded by a gasket 88. The gasket 88 may be formed from a low durometer material or any of a variety of materials suitable for providing a pressure-tight seal during an expansion or inflation process. A low durometer material may include materials that have a durometer that is lower than that of the base plate 91 of the inflation rig assembly 75 so that compressing the gasket 88 against the base plate 91 (and/or the inflation feature 41) results in forming a seal.

The expansion material line (e.g., 89, 90) may be any known type of conduit material suitable for fluid communication with an expansion material source, connection with the nozzle 87, and delivery of the expansion material (e.g., tubing). In some examples, the expansion material line may include a main expansion material line in fluid communication with the expansion material source, where the main expansion material line may be split into a first expansion material line 89 of the first nozzle assembly 83 and a second expansion material line 90 of the second nozzle assembly 85. In such examples, the expansion material line may further include one or more valves to allow for controlled flow of expansion material between the first nozzle assembly 83 and the second nozzle assembly 85. For example, in use, the one or more valves can allow the expansion material to flow through the first nozzle assembly 83 while obstructing flow through the second nozzle assembly 85. Similarly, in use, the one or more valves can allow the expansion material to flow through the second nozzle assembly 85 while obstructing flow through the first nozzle assembly 83. However, it will be appreciated that the one or more valves can allow the expansion material to flow through the first nozzle assembly 83 and the second nozzle assembly 85 simultaneously. Similarly, the one or more valves may provide for different flow rates, pressures, and the like. In other examples, each of the first expansion material line 89 and the second expansion material line 90 can be in fluid communication with separate expansion material sources.

The second portion 79 of the inflation rig assembly 75 may include a base plate 91, as shown, for example, in FIG. 3. The base plate 91 may include one or more grooves (e.g., 93, 94) on a top surface 95 thereof. For example, as shown in FIG. 3, the base plate 91 includes a first groove 93 and a second groove 94. The number of the one or more nozzle assemblies (e.g., 83, 85) provided on the inflation rig assembly 75 can be the same as the number of the one or more grooves (e.g., 93, 94) provided in the base plate 91, and the one or more nozzle assemblies (e.g., 83, 85) can be in alignment, or substantial alignment, with the one or more grooves (e.g., 93, 94). For example, the first groove 93 and the second groove 94 can be in alignment with the first nozzle assembly 83 and the second nozzle assembly 85, respectively.

The base plate 91 may further include one or more secondary alignment features (e.g., 96) configured to facilitate positioning the inflation feature 41 of the shipping package on the inflation rig assembly 75 for inflation (e.g., as in FIGS. 8 and 9). In particular, the secondary alignment features (e.g., 96) can correspond to complementary primary alignment features (e.g., 71) on the inflation feature 41 for positioning relative to the same. In some examples, the secondary alignment features (e.g., 96) can facilitate securement of the inflation feature 41 to the inflation rig assembly 75. In particular, in certain examples, the base plate 91 can include protrusions to receive the offset holes 71 of the inflation feature 41. For example, FIG. 3 depicts the base plate 91 having two offset pins 96 extending upwardly from the top surface 95 thereof. The offset pins 96 may be configured to receive or be surrounded by corresponding offset holes 71 on the inflation feature to ensure securement of the inflation feature 41 to the inflation rig assembly 75 as well as proper positioning and orientation of the inflation feature 41 for inflation or expansion of the expansion chambers. However, it will be appreciated that, in other examples, a configuration of pins or other secondary alignment features can be symmetrical, especially where no particular orientation is required for the package blank 110. In some examples, the one or more secondary alignment features (e.g., 96) may be centrally positioned relative to a width of a base plate 91. For example, the offset pins 96 shown in FIG. 3 are positioned between the first groove 93 and the second groove 94.

While the secondary alignment features of the base plate 91 of FIG. 3 are two offset pins 96, centrally positioned thereon, it will be appreciated that secondary alignment features may be provided in any of a variety of suitable shapes and configurations in any suitable amounts and sizes and in any of a variety of suitable positions on a base plate of an inflation rig assembly. For example, other suitable secondary alignment features may include one or more of grooves, rails, notches, impressions, depressions, ridges, pins, protrusions, lines, dots, images, heat seals, and icons. The one or more secondary alignment features (e.g., 96) may be configured for alignment with complementary alignment features (i.e., primary alignment features) on the inflation feature 41 by a human operator and/or through automated operations.

Figure 5:
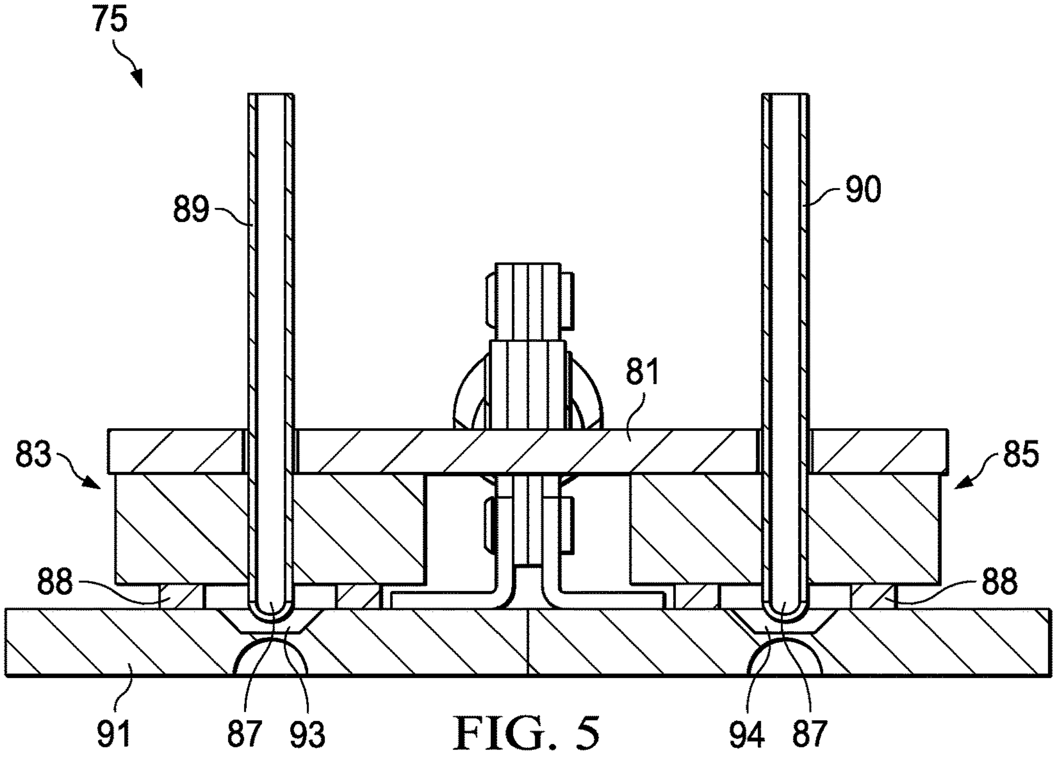
FIG. 5 depicts a cross-sectional view of the inflation rig assembly of FIG. 3, as shown in FIG. 4 in the second position, along a line bisecting both nozzles.
Figure 6:
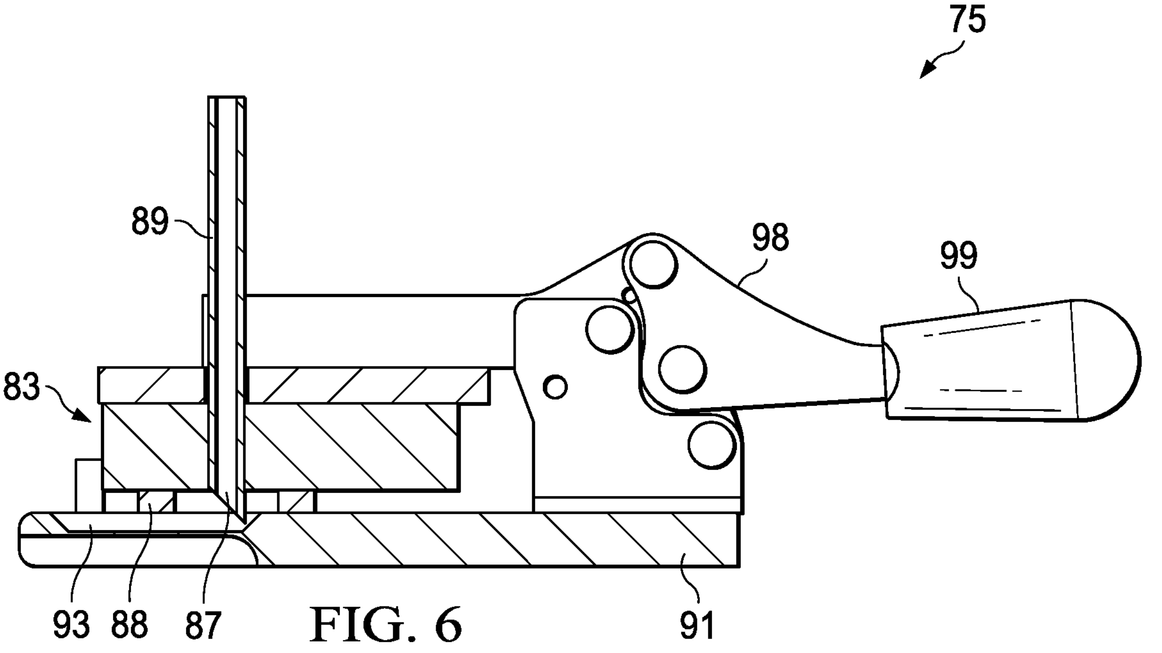
FIG. 6 depicts a cross-sectional view of the inflation rig assembly of FIG. 3, as shown in FIG. 4 in the second position, along a line bisecting a first groove, lengthwise.
Figure 7:
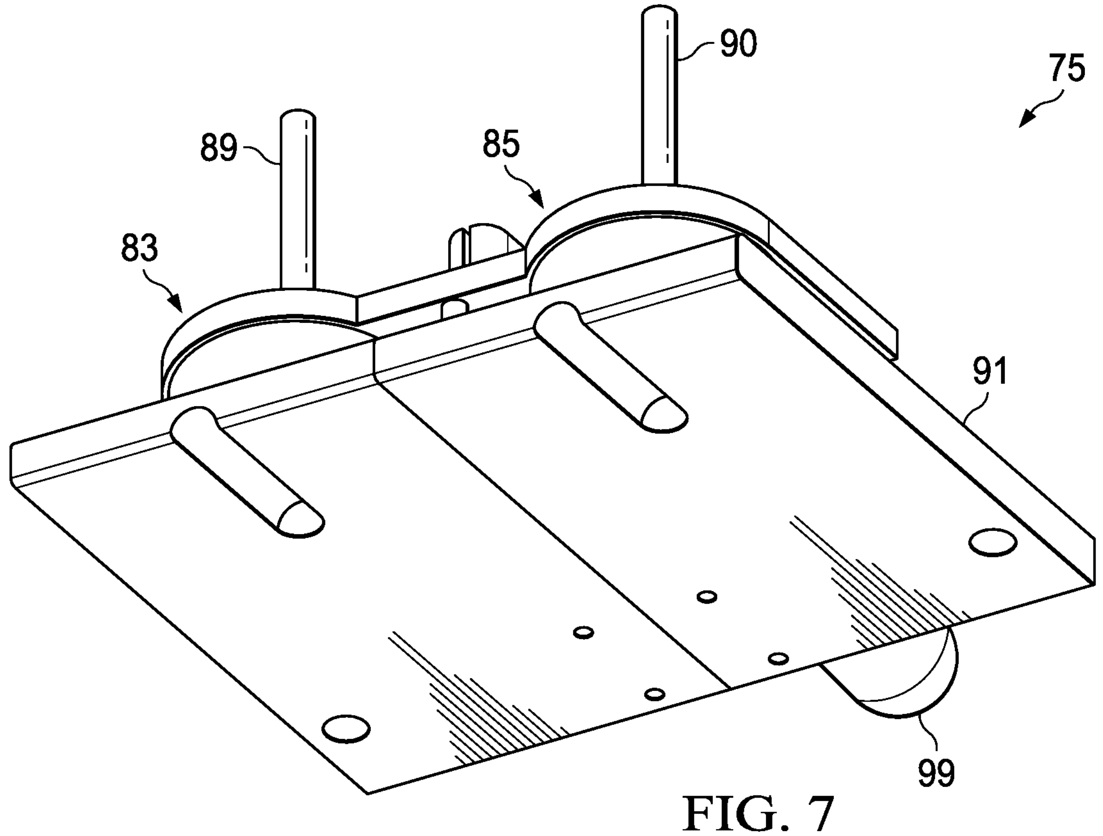
FIG. 7 depicts a bottom isometric view of the inflation rig assembly of FIG. 3, as shown in FIG. 4 in the second position.

The first portion 77 and the second portion 79 of the inflation rig assembly 75 can be movably associated with each other. For example, and as shown in FIGS. 3-9, the frame (e.g., 81) can be pivotably connected to the base plate 91, such that the first portion 77 may be movable between a first position, in which the one or more nozzle assemblies (e.g., 83, 85) are away from the second portion 79 (e.g., as in FIGS. 3 and 8), and a second position, in which a the one or more nozzle assemblies (e.g., 83, 85) are positioned adjacent to, or in contact with, the second portion 79. Specifically, and as shown in FIGS. 5 and 6, in the second position, a tip of each nozzle 87 of the one or more nozzle assemblies (e.g., 83, 85) may be positioned within a corresponding groove of the one or more grooves (e.g., 93, 94) of the base plate 91.

Figure 4:
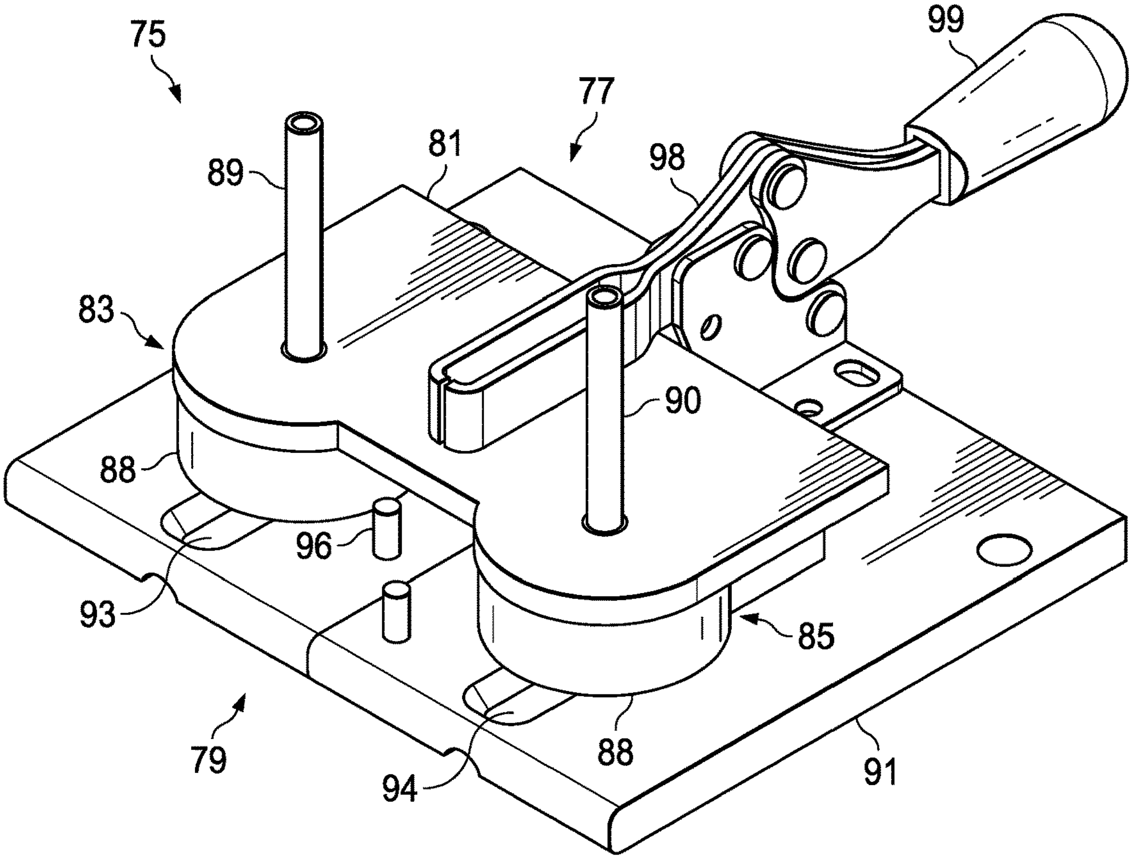
FIG. 4 depicts an isometric view of the inflation rig assembly of FIG. 3 in a second position.

In some examples, and as best shown in FIGS. 4 and 6, the inflation rig assembly 75 may further include a hinge 98 to couple the frame 81 to the base plate 91. In such examples, the hinge may further includes a handle 99 capable of moving the first portion 75, relative to the second portion 79, between the first position and the second position. Further, in such examples, the handle 99 may be lockable in either or both of the first position and the second position, such that, for example, the gaskets 88 may be secured in a pressure-tight seal for the expansion or inflation process. While FIGS. 4 and 6 depict the first portion 75 connected to the second portion 79 by a hinge, it will be appreciated that in other examples, a first portion may be coupled to a second portion by any suitable connection means such that the first portion may be movable between a first position and a second position. It will also be appreciated that in other examples, a first portion may be unconnected to a second portion yet movable between a first position and a second position. For example, in such embodiments, the first portion 77 may be connected to an arm configured to allow movement of the first portion 77 between the first position and the second position. In such examples, the arm can be extendible or flexible or include one or more joints to effect such movement. Accordingly, while FIGS. 4 and 6 depict the first portion 75 connected to the second portion 79 by a hinge, such that the first portion 77 may pivot between the first position and the second position, it will be appreciated that in other examples, movement of a first portion, relative to the second portion, between a first position and a second position, can be rotational, translational, or any of a variety of suitable motions.

Further, while FIGS. 4 and 6 depict a handle 99 to allow for manual movement between the first position and the second position, it will be appreciated that in other examples, a first portion may be moved, relative to a second portion, from a first position to a second position by any of a variety of suitable, known methods, including, for example, known manual and automated means. For example, the first portion 75 may be moved, relative to the second portion 79, between the first position and the second position manually by a foot pedal. In other examples, the first portion 75 may be moved, relative to the second portion 79, between the first position and the second position through automated means. In such examples, movement between the first position and the second position may be initiated by positioning of the package blank on the base plate 91 and/or upon inflation of the shipping package (e.g., once a predetermined inflation pressure is reached).

Methods of Manufacturing, Inflating the Package

Packages according to the present disclosure may be manufactured according to a variety of methods. For example, the package may be assembled according to the method described below. Two films (secondary inner sheet 23, and inner sheet 12) may be placed onto one another. A plurality of primary expansion chamber seams may be formed by heat sealing the inner sheet 12 and secondary inner sheet 23 in the top of the package. Two additional films (outer sheet 14, secondary outer sheet 16) may be placed onto one another and a plurality of secondary expansion chamber seams may be formed by heat sealing the outer sheet 14, and secondary outer sheet 16 together. In some examples, the four films may then joined together by heat sealing all four films together in the region of a tear strip. The films, as shown in FIG. 1, may be folded and then sealed through all layers at outer seams to form the package. The primary expansion chamber seams may be formed by a heat or other sealing operation to define the primary expansion chamber(s). A plurality of secondary expansion chamber seams may be formed by a heat or other sealing operation to define the secondary expansion chambers.

The sheets 12, 14, 23, and/or 16 may be joined by any suitable means, including using heat, glue or any of the other means and methods described herein and other known and later developed methods for joining flexible materials. A heat seal die may be used to form the seams. If so, the die is heated to the desired temperature and pressed against the films 12, 14, 16, and 23 to create the seams. The sheets may be positioned relative to the heat seal die a second time to create additional expansion chambers. Alternatively, in examples including three sheets, the package may be formed from the inner sheet, the outer sheet, and the secondary outer sheet according to the methods described in, for example, U.S. Patent Publication No. 2020/0024055, which is incorporated herein by reference.

Prior to forming the expansion chamber seams, a one-way film valve may be placed between any pair of abutting sheets. The film valve may span an expansion chamber seam. One-way film valves are conventionally known and are described, for example, at U.S. Pat. Pub. No. 2006/0096068. The film valve may include an ink or polymer material on at least a part of the film valve that enables the film valve to be sealed into the seams created by the heat seal die, but without sealing the film valve shut.

Before or after the expansion chamber(s) are formed, the ends and/or sides of the sheets may be joined to form the article reservoir and the general shape of the package. In some examples, articles can be packed into the article reservoir prior to inflation or expansion of the package. The article may optionally be scanned (e.g., for inventory of accounting purposes) prior to packing of the same into the article reservoir. In addition to or in place of scanning the article, the shipping package may optionally be scanned as well. In such examples, the closeable opening can be closed and/or sealed subsequent to packing the article but prior to inflation or expansion of the package. According to one method of packing articles in shipping packages, articles may be scanned and/or packed into the article reservoir of a second package while a first package is being inflated. It will be appreciated that methods of packing allowing for simultaneous execution of multiple packing steps can improve fulfillment times.

Packages according to the present disclosure may be inflated according to the method described herein. For example, either the blank 110 described above or an already-folded package, in an uninflated or non-expanded state, can be provided for expansion or inflation. The inflation feature 41 can be positioned on and/or secured to the inflation rig assembly 75 in the first position, such that the bottom surface 73 of the inflation feature 41 is in contact with a top surface 95 of the base plate 91. Moreover, the inflation feature 41 can be positioned and/or secured to the inflation rig assembly 75 by placing the one or more primary alignment features (e.g., 71) in alignment with the secondary alignment features (e.g., 96), such that the one or more inflation ports (e.g., 45, 47) are positioned over the one or more grooves (e.g., 93, 94). For example, and as shown in FIG. 8, the offset holes 71 of the inflation feature 41 can be positioned over the two offset pins 96 to ensure alignment and/or securement of the inflation feature 41, as well as proper positioning and orientation of the uninflated blank 110 or package for inflation. Also as shown in FIG. 8, the first inflation port 45 and the second inflation port 47 are positioned over the first groove 93 and the second groove 94, respectively.

Upon alignment and/or securement of the inflation feature 41 on the inflation rig assembly 75, the first portion 77 of the inflation rig assembly 75 may be moved to the second position, such that the tips of the nozzles 87 penetrate the apertures 48, 49 of the inflation ports 45, 47. It will be appreciated that in certain examples, where an inflation feature is provided with inflation ports free of apertures, tips of nozzles may puncture the inflation ports, for example, at the second end thereof. Once the nozzles 87 penetrate the apertures 48, 49 or otherwise enter the inflation ports 45, 47, the inflation ports 45, 47 are in fluid communication with the expansion material source. Moving the first portion 77 of the inflation rig assembly 75 to the second position also places the gaskets 88 of the nozzle assemblies 83, 85 in contact with one or both of the top surface 53 of the inflation feature 41 and the base plate 91 to form a seal.

In some examples, a fulfillment operator and/or automated equipment may activate the expansion material source to allow for flow of the expansion material through the nozzle assemblies 83, 85. In other examples, the expansion material source may remain active, such that flow of the expansion material through the nozzle assemblies 83, 85 and into the inflation ports 45, 47 may proceed as soon as fluid communication is established between the nozzles 87 and the inflation ports and thereby the expansion ports (i.e., when the first portion 77 of the inflation rig assembly 75 is moved to the second position). Once an expansion material begins to flow through the apertures 48, 49, for example, and into the inflation ports 45, 47, the inflation ports 45, 47, at least partially restricted from above by the seal of the gaskets 88, expand into the grooves 48, 49 underneath to allow the flow of expansion material to proceed through to the expansion ports 50, 51. Expansion or inflation of the shipping package may continue until the package is in an inflated or expanded state. In some examples, expansion or inflation may continue until a predetermined inflation pressure is reached.

As described above, in some examples, the expansion material line may include a main expansion material line in fluid communication with the expansion material source, where the main expansion material line may be split into the first expansion material line 89 and the second expansion material line 90, and where the expansion material line may further include one or more valves to allow for controlled flow of expansion material between the first nozzle assembly 83 and the second nozzle assembly 85. Accordingly, in some examples, the one or more primary expansion chambers and the one or more secondary expansion chambers may be inflated in sequence. Some examples of packages may inflate more quickly when the one or more primary expansion chambers are inflated first, while other packages may inflate more quickly when the one or more secondary expansion chambers are inflated first. In other examples, the one or more primary expansion chambers and the one or more secondary expansion chambers may be inflated simultaneously. Compressed air, or another expansion material, may be introduced through the inflation feature 41 to expand the expansion chamber(s). The expansion material (e.g., air) may be introduced at any suitable pressure as described herein. For example, air may be introduced at a pressure from about 1 psig to about 20 psig to expand the chamber(s) without risk of rupture of the sheets by overpressure. Further, as noted, other expansion materials may be used and the primary expansion chambers and secondary expansion chambers may be expanded with different materials and/or to different pressures.

In certain examples, a fulfillment time can refer to a total cycle time from a moment an operator begins to form a package to a moment the package is released from operator's hand to go outbound, to forming a next package. Fulfillment time may include multiple steps such as, for example, inserting a product into the package and sealing the package, among others. In some examples, a fulfillment time for a package of the present disclosure is about 14 seconds or less; in some examples, about 13 seconds or less; and in some examples, about 12 seconds or less. In certain examples, the methods of inflation described herein can reduce fulfillment times by about 40% or more; in some examples, by about 45% or more; in some examples, by about 50% or more; and in some examples, by about 55% or more relative to a fulfillment time for a traditional cardboard box with dunnage.

Any one or all of the openings 30, expansion port(s) 50 and/or vent(s) 21 may include an indicator that helps the fulfillment operator and/or automated equipment find and/or use the feature. For example, the opening 30 may have a color, texture, additional material, or indicia 84 to indicate that it is the opening 30 through which articles are placed into the reservoir 28 and/or to indicate where the expansion port 50, 51 is located.

The materials of the package may be pre-sealed in certain locations to help the fulfillment operator and/or automated equipment find the opening. That is, sealing together the different sheets in the region of the opening other than the two facing inner sheets 12 can make it easier for the user to find the opening. Likewise, it may be helpful to scallop or otherwise shape or add rigidity to the distal edges of one or more of the materials making up an opening. Having differently shaped or scalloped distal edges can help guide the user to the correct sheets forming any particular opening or port.

Closing the opening can be done with the same means and methods used to close any inflation ports 45, 47 and/or expansion port 50, 51, as described above, and can be done at the same time, before or after any one or more of the inflation ports 45, 47 and/or the expansion ports 50, 51 are closed. Exemplary means to close the inflation ports 45, 47, expansion ports 50, 51 and/or opening include, but are not limited to, adhesives, mechanical closures, heat bonding, chemical bonding, one-way valves, pressure, static, friction, magnets, clips, folding, hook and loop fasteners, zippers, buttons, sewing, strings, drawstrings, bands, interference-type fasteners, combinations thereof and any other types of closure mechanisms. One method to close the opening, inflation ports 45, 47, and/or expansion ports 50, 51 is to heat seal the inflation ports 45, 47, expansion ports 50, 51, and/or the opening at the same time in a single process. However, it may be desirable to separate the expansion process from the process used for closing the opening. Another way to close the opening is to use the expansion of one or more of the expansion chambers to partially or fully close the opening. In such configurations, the article(s) can be placed into the package before or after expansion of the expansion chambers. In some configurations, it may be desirable to expand one or more expansion chambers and not others prior to placing one or more articles into the reservoir. Doing so can present the package as a structured container (as opposed to an unexpanded, flexible package) which may be beneficial to the fulfillment operator and/or automated equipment.

A plurality of packages may be formed from larger continuous sheets of material. The packages may be formed simultaneously or in series. The packages may be formed at the location they are used for packing or may be formed or partially formed separately and shipped to the fulfillment location. The packages may be stored, for example, on a roll, on wickets, in cartridges, stacked or otherwise, as desired. The packages may be formed, filled and expanded by humans, automatically by machines such as robots, or both. In addition, it may be desirable to present the packages in a configuration that they can be filled, sealed, and expanded in a single operation, in a continuous operation of several steps or in multiple separate operations. Special fulfillment stations can be used that are configured to open the opening 30 or allow the package to be held in a way (e.g., handing through a hole in a table) that allows the user to more easily place the articles into the reservoir.

The packages may be configured such that as one package is removed from the roll, stack, wicket, cartridge, etc., the next package is presented to the fulfillment operator and/or automated equipment in a configuration that can help simplify placing one or more articles into the reservoir and/or the expansion material into the expansion chambers. Examples of ways to do this include, but are not limited to, folding, creasing, stiffening, treating, or biasing the materials, adding materials and/or inflating a portion of the package prior to or at the time the package is presented to the fulfillment operator and/or automated equipment that will place one or more articles in the reservoir.

Alternatively, one package may be frangibly continuous with the package next to it in the wicket, roll, stack, cartridge, etc. such that removing one package from the wicket, roll, stack cartridge etc. will present a portion of the next package in an open or partly opened configuration. In some executions, a portion of the package is inflated at or near the opening and/or expansion ports 50, 51 and the packages are stacked or otherwise arranged for shipping and storage such that the inflated regions are held in a compressed state. Once the package is presented for use (e.g., filling the reservoir or expansion chambers), the inflated portion expands and presents the fulfillment operator and/or automated equipment with an intuitive and/or beneficial configuration for the next step(s) in the use. Other executions may include partially pre-expanding one or more of the expansion chambers to help the user load articles into the article reservoir. After loading of the articles, the partially pre-expanded expansion chambers can be further expanded to provide the desired configuration for the package.

In certain situations, it may be desirable to configure the package such that the opening to the reservoir is located on the same side as the inflation feature 41 or, in certain examples, the evacuation feature. This can make it easier for a human user to insert an article into the package and also direct an expansion material into the inflation feature 41. Alternatively, it may be desirable to have the opening of the reservoir located on a different side of the package from the inflation feature 41. This could allow for easier identification of the different openings and/or may allow for simultaneous introduction of an article into the reservoir and an expansion material into an inflation feature 41. This can also allow for simplification of the sealing process because the retrieval feature can be located away from where the expansion port is sealed.

The packages can use any and all materials, structures, and/or features for the packages, as well as any and all methods of making and/or using such packages, disclosed in the following US patents and applications: (1) U.S. Pat. No. 9,815,258 filed May 7, 2012, entitled "Film Based Packages"; (2) U.S. Publication No. 2013/0292395 A1 filed May 7, 2012, entitled "Film Based Packages"; (3) U.S. Publication No. 2013/0292287 A1 filed Jul. 26, 2012, entitled "Film Based Package Having a Decoration Panel"; (4) U.S. Patent application 61/727,961 filed Nov. 19, 2012, entitled "Packages Made from Flexible Material"; (5) U.S. Pat. No. 10,040,581 filed Aug. 6, 2012, entitled "Methods of Making Film Based Packages"; (6) U.S. Publication No. 2013/0292413 A1 filed Mar. 13, 2013, entitled "Flexible Packages with Multiple Product Volumes"; (7) U.S. Pat. No. 9,469,088 filed Mar. 15, 2013, entitled "Flexible Materials for Flexible Containers" 61/789,135; (8) U.S. Patent Application 62/701,273 filed Jul. 20, 2018 entitled "Adsorbent Matrix as Propellant in Aerosol Package"; (9) U.S. Patent Application 62/783,535 filed Dec. 21, 2018 entitled "Shaped Flexible Shipping Package and Method of Making"; (10) U.S. Patent Application 62/810,987 filed Feb. 27, 2019 entitled "Flexible Shipping Package"; (11) U.S. Patent Application 62/838,955 filed Apr. 26, 2019 entitled "Flexible Shipping Package and Method of Making"; (12) U.S. Patent Application 62/851,224 filed May 22, 2019 entitled "Flexible Package and Method of Manufacture"; (13) U.S. Patent Application 62/851,230 filed May 22, 2019 entitled "Flexible Package and Method of Manufacture"; (14) U.S. Patent Application 62/864,549 filed Jun. 21, 2019 entitled "Flexible Package and Method of Manufacture"; and (15) U.S. Patent Application 62/864,555 filed Jun. 21, 2019 entitled "Flexible Package"; each of which is hereby incorporated by reference.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or patent publication, is hereby incorporated herein by reference in its entirety unless expressly excluded or otherwise limited. The citation of any document is not an admission that it is prior art with respect to any document disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

While certain embodiments, variations and features have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of inflating a shipping package, the method including the steps of:

a. providing a uninflated shipping package, the shipping package including one or more inner sheets; one or more outer sheets, wherein the one or more inner sheets and the one or more outer sheets are joined together at outer seams thereof and forming one or more expansion chambers adapted to receive an expansion material; one or more expansion ports in fluid communication with the one or more expansion chambers through which an expansion material can be introduced into the one or more expansion chambers; and an inflation feature, wherein the inflation feature extends from the one or more inner sheets and the one or more outer sheets adjacent the one or more expansion ports, the inflation feature having a top surface and a bottom surface and including one or more primary alignment features and one or more inflation ports, wherein each of the one or more inflation ports is in fluid communication with the expansion ports at a first end;

b. providing an inflation rig assembly, the inflation rig assembly including a first portion including a frame and one or more nozzle assemblies, wherein the nozzle assemblies include a nozzle; a gasket surrounding the nozzle; and an expansion material line connected to the nozzle and in fluid communication with an expansion material source; and a second portion including a base plate, wherein the base plate includes one or more secondary alignment features and one or more grooves that correspond to the one or more nozzle assemblies; and wherein the frame is movably associated with the base plate, such that the first portion is movable between a first position, in which the nozzle assemblies are away from the base plate second portion, and a second position, in which a tip of each nozzle of the one or more nozzle assemblies is positioned within a corresponding groove of the one or more grooves of the base plate;

c. positioning the uninflated shipping package on to the inflation rig assembly with the first portion in the first position, wherein the bottom surface of the inflation feature is in contact with the base plate and the one or more primary alignment features are in alignment with the secondary alignment features, such that the one or more inflation ports are positioned over the one or more grooves;

d. moving the first portion of the inflation rig assembly to the second position, such that the tips of the nozzles penetrate a second end of the respective inflation ports, the inflation ports are in fluid communication with the expansion material source, and the gaskets are in contact one or both of the inflation feature and the base plate to form a seal; and e. inflating the shipping package to an inflated state.

* * * * *